(12) United States Patent
Russell

(10) Patent No.: US 7,722,298 B2
(45) Date of Patent: May 25, 2010

(54) HOT TAP MACHINE

(76) Inventor: Larry Rayner Russell, 3607 Gramercy, Houston, TX (US) 77025

( * ) Notice: Subject to any disclaimer, the term of this patent is extended or adjusted under 35 U.S.C. 154(b) by 868 days.

(21) Appl. No.: 11/594,385

(22) Filed: Nov. 8, 2006

(65) Prior Publication Data

US 2007/0104547 A1    May 10, 2007

Related U.S. Application Data

(60) Provisional application No. 60/735,977, filed on Nov. 10, 2005.

(51) Int. Cl.
B23B 35/00    (2006.01)
B23B 41/08    (2006.01)

(52) U.S. Cl. .............. 408/1 R; 408/36; 408/56; 408/67; 408/101; 408/137; 137/318

(58) Field of Classification Search ........ 408/1 R, 408/36, 56, 57, 59, 67, 100–102, 111, 118, 408/30, 124, 137, 138, 222, 224–225; 137/317–318
See application file for complete search history.

(56) References Cited

U.S. PATENT DOCUMENTS

| | | | | |
|---|---|---|---|---|
| 527,877 | A * | 10/1894 | O'Neil | 137/318 |
| 1,347,614 | A * | 7/1920 | Brown | 408/137 |
| 2,115,992 | A * | 5/1938 | Koppl | 137/318 |
| 2,813,280 | A * | 11/1957 | Huffman | 408/10 |
| 2,838,962 | A * | 6/1958 | Curtis | 408/36 |
| 3,068,727 | A * | 12/1962 | Wertman | 408/36 |
| 3,804,545 | A * | 4/1974 | Chistov et al. | 408/101 |
| 3,935,788 | A * | 2/1976 | Gilmore | 409/178 |
| 4,890,424 | A | 1/1990 | Dzewaltowski | |
| 4,978,257 | A * | 12/1990 | Nowman | 408/111 |
| 5,984,594 | A * | 11/1999 | Osborne et al. | 408/1 R |
| 6,640,827 | B1 * | 11/2003 | McClure | 137/318 |
| 6,648,562 | B1 | 11/2003 | Calkins et al. | |
| 7,441,993 | B2 * | 10/2008 | Evans | 408/1 R |

FOREIGN PATENT DOCUMENTS

| WO | WO 99/07506 A | 2/1999 |
|---|---|---|
| WO | WO 99/66243 A | 12/1999 |

* cited by examiner

*Primary Examiner*—Daniel W Howell
(74) *Attorney, Agent, or Firm*—Elizabeth R. Hall

(57) ABSTRACT

The present invention provides a hot tap machine having independent speed drives for the center drill and the holesaw that can be remotely operated. The hot tap machine of the present invention also has improved vibratory damping and coupon stability and retention. During operation, the machine cartridge holding the machine internal assemblies of the hot tap machine of the present invention is, except for its controls and external support systems, entirely contained within its pressure containment housing which is sealingly attached to the hot tap fitting on the pipe. An advantage in the operation of the present invention is the independence of the center drilling operation and the pipe coupon cutting operation.

30 Claims, 10 Drawing Sheets

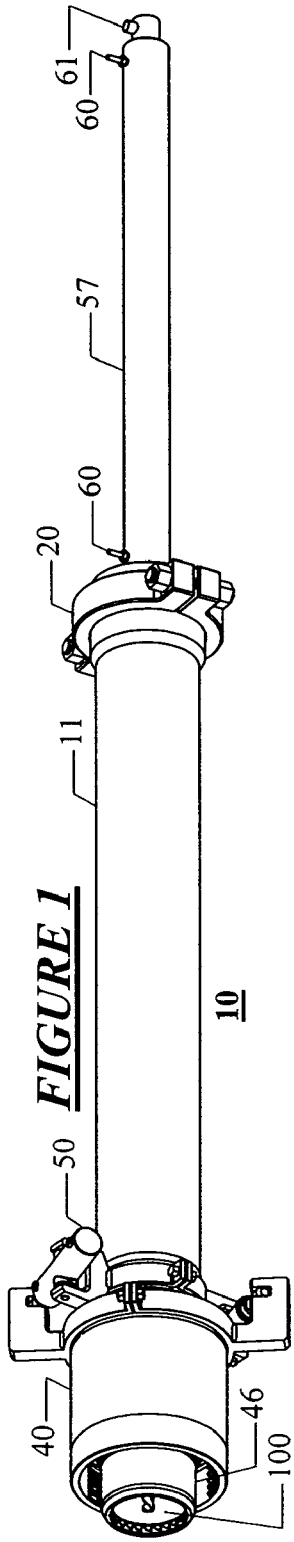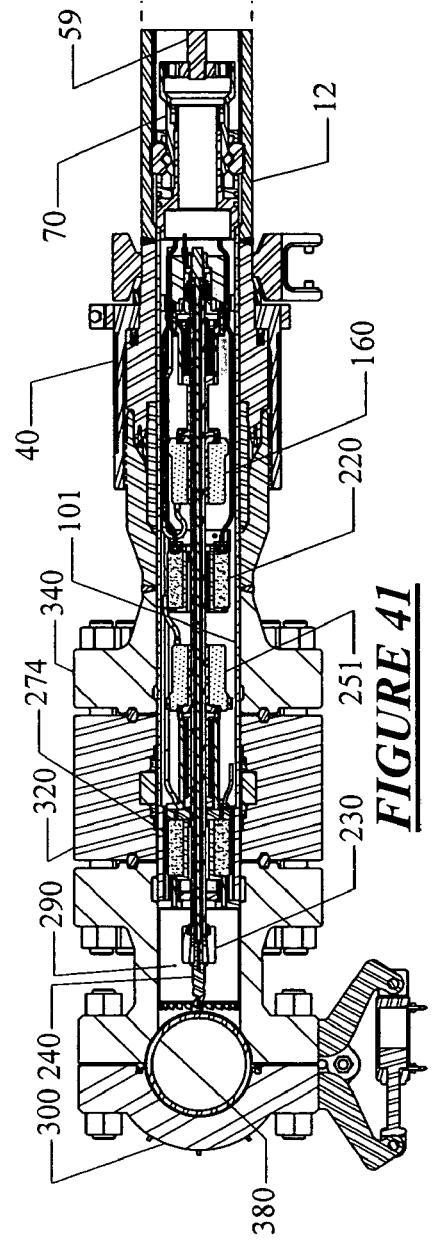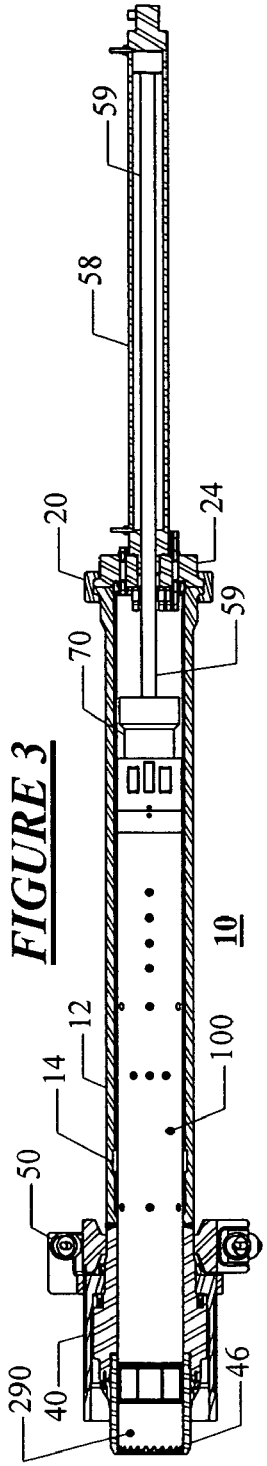

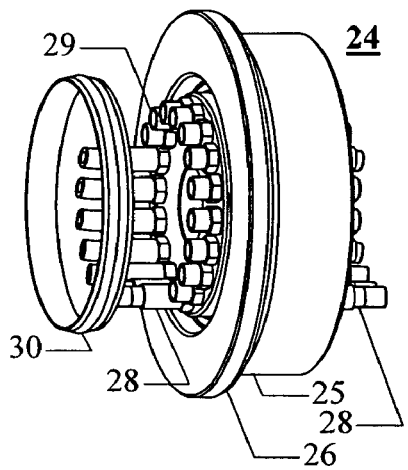
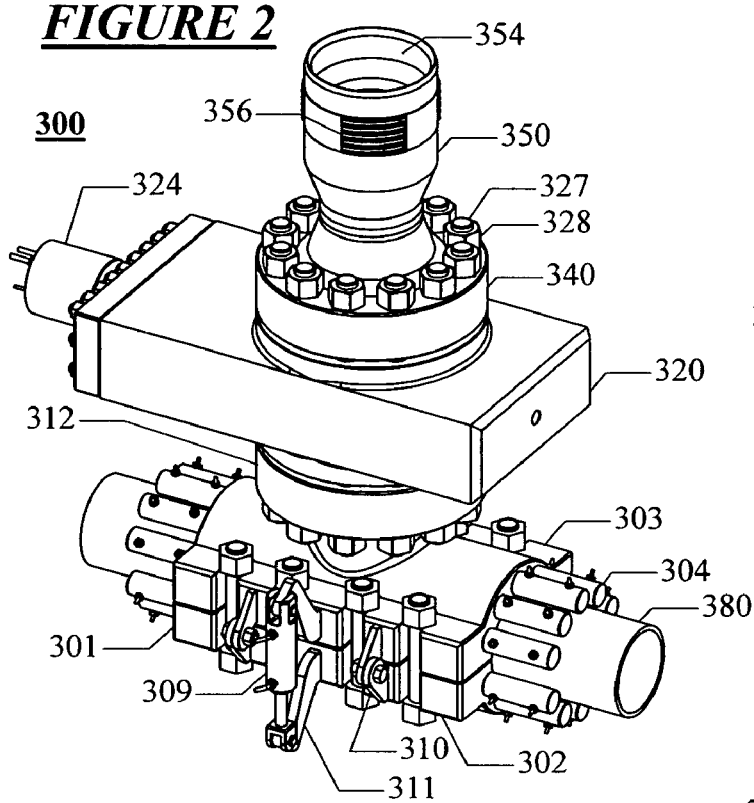
FIGURE 2
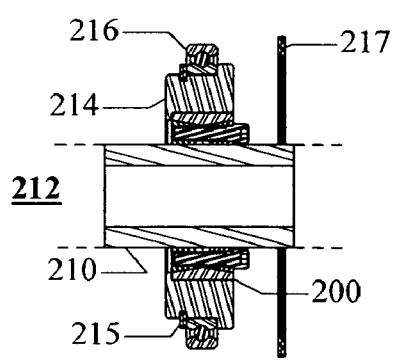
FIGURE 26
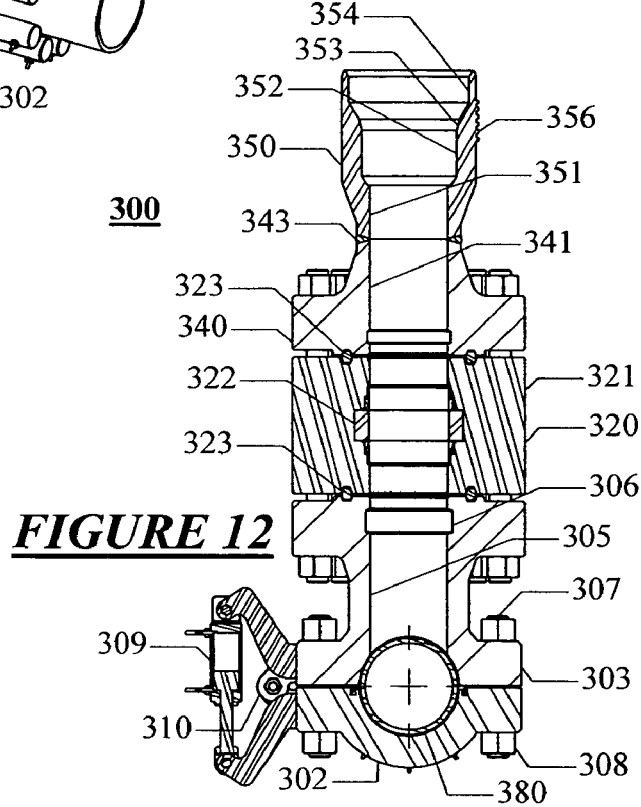
FIGURE 12
FIGURE 25

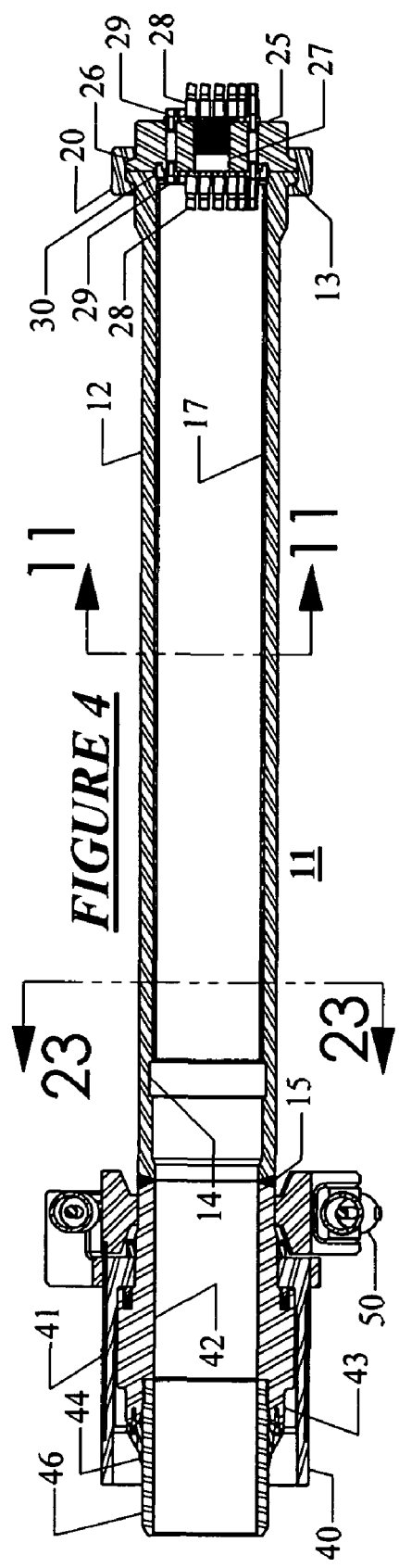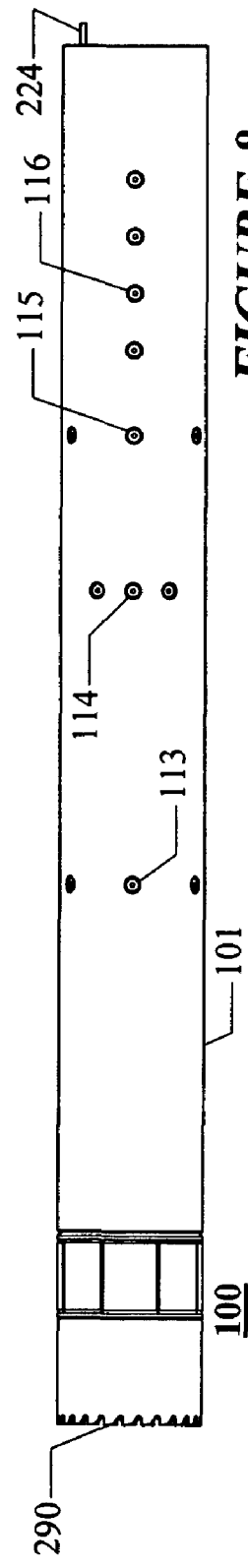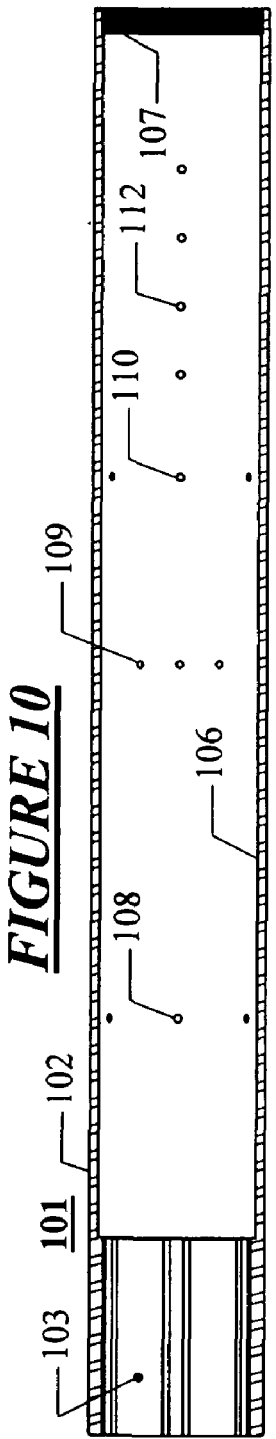

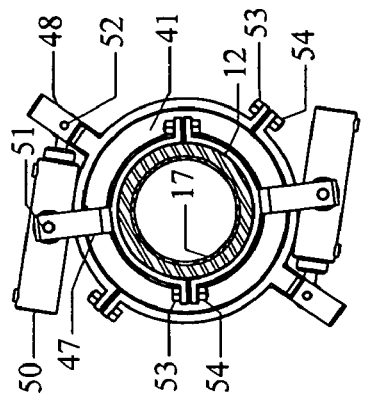
FIGURE 23
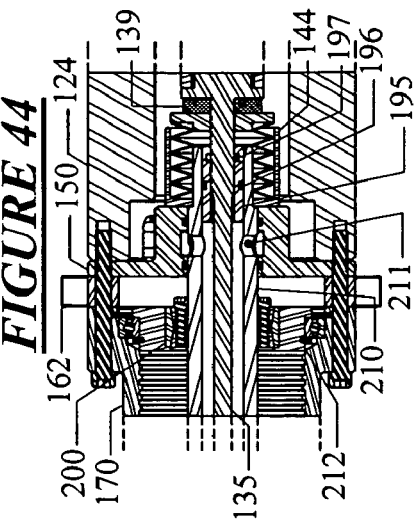
FIGURE 44
FIGURE 21
FIGURE 38
FIGURE 9
FIGURE 22
FIGURE 39
FIGURE 40
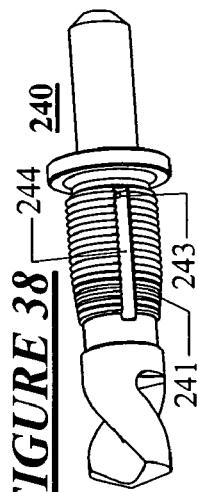
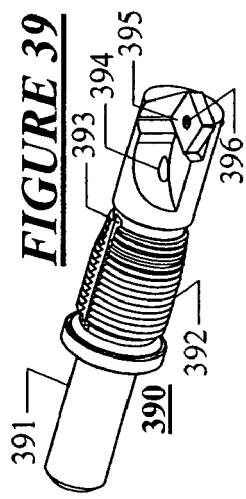
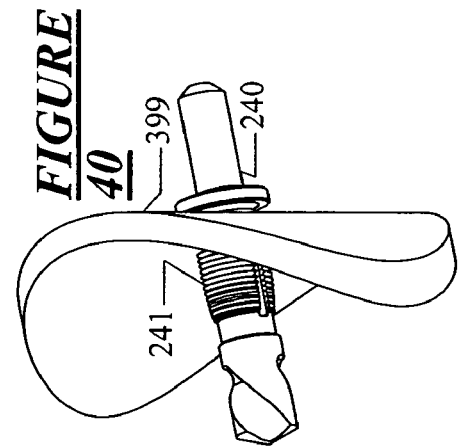

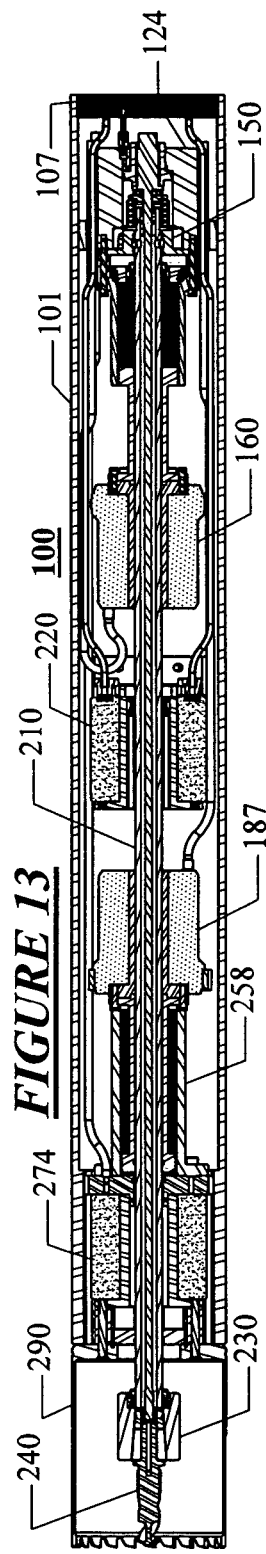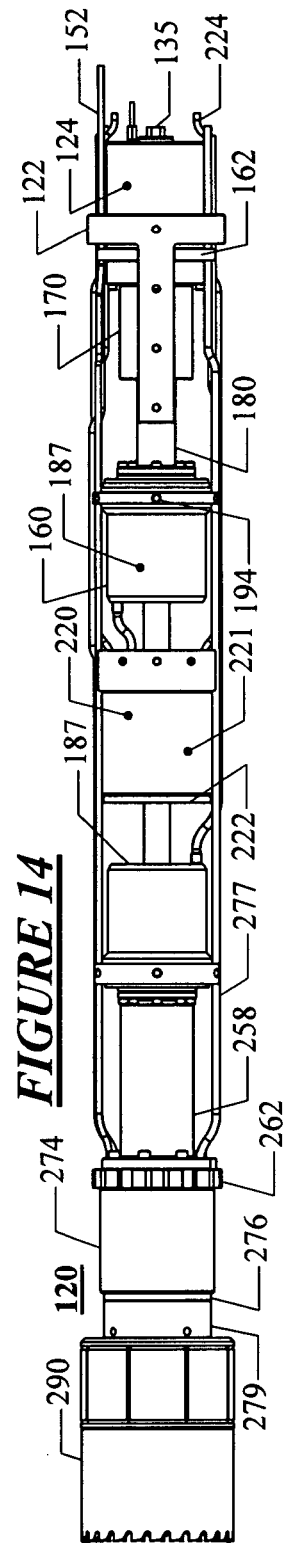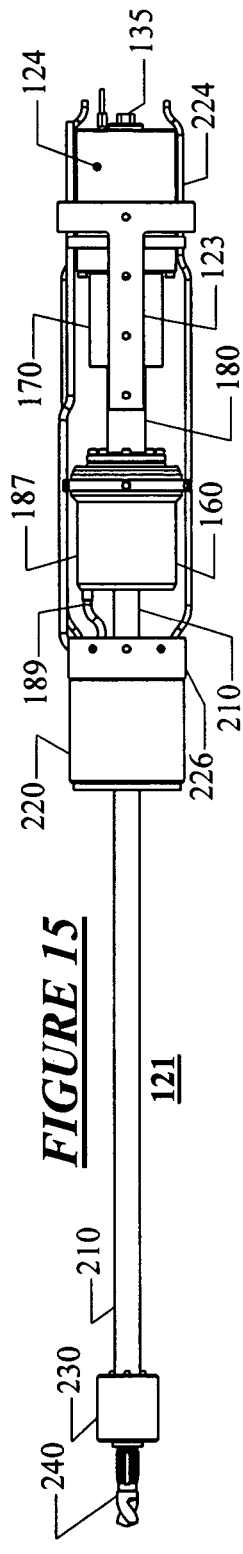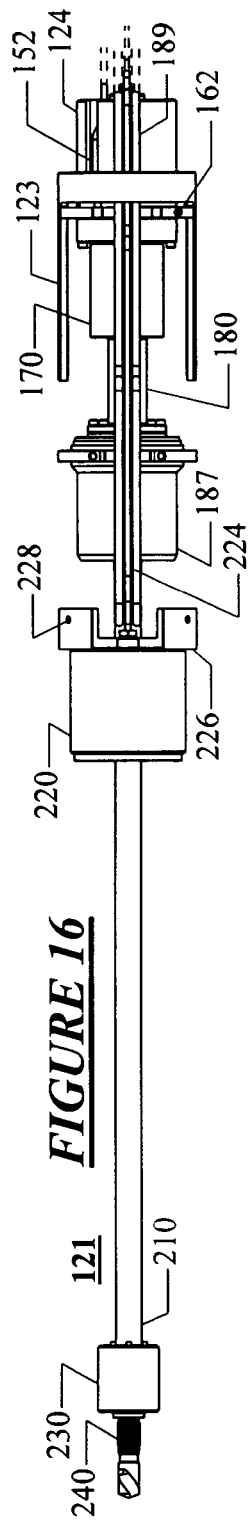

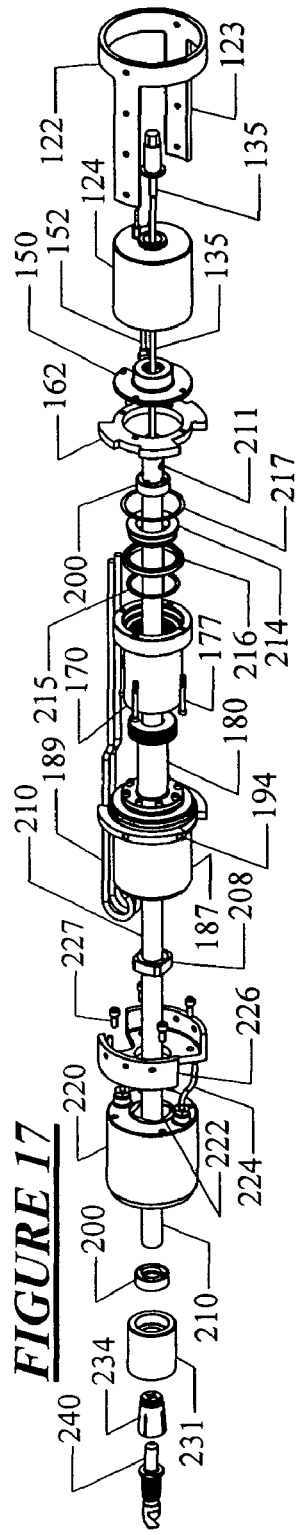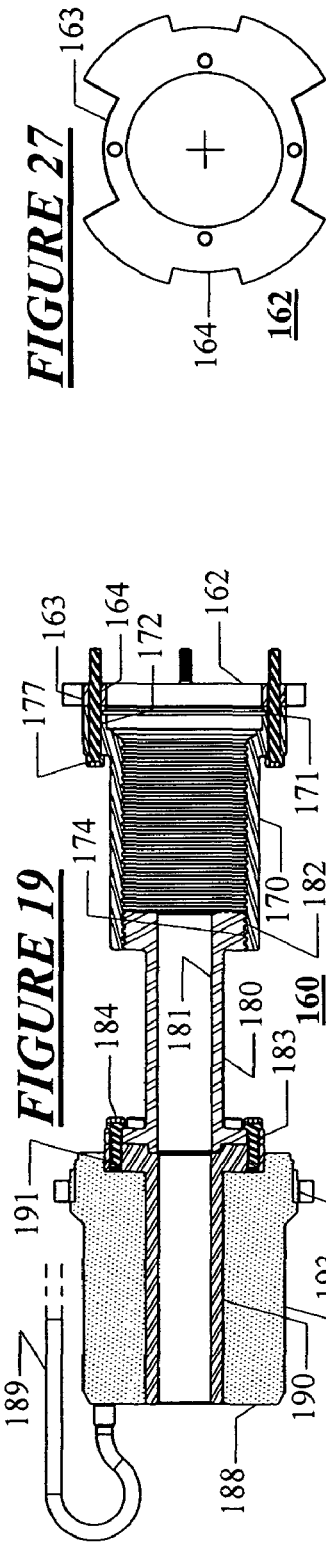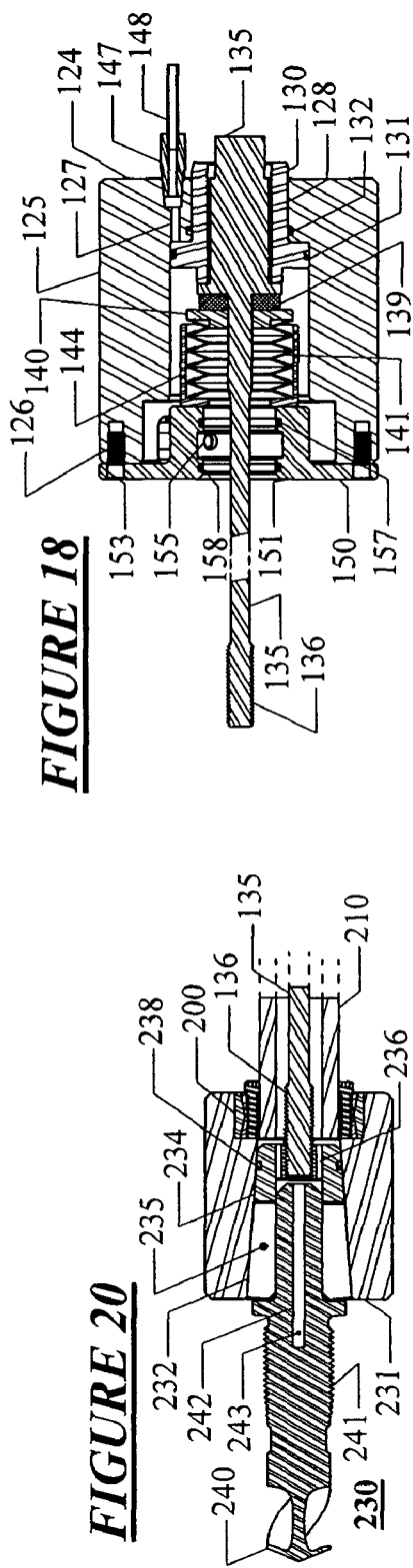

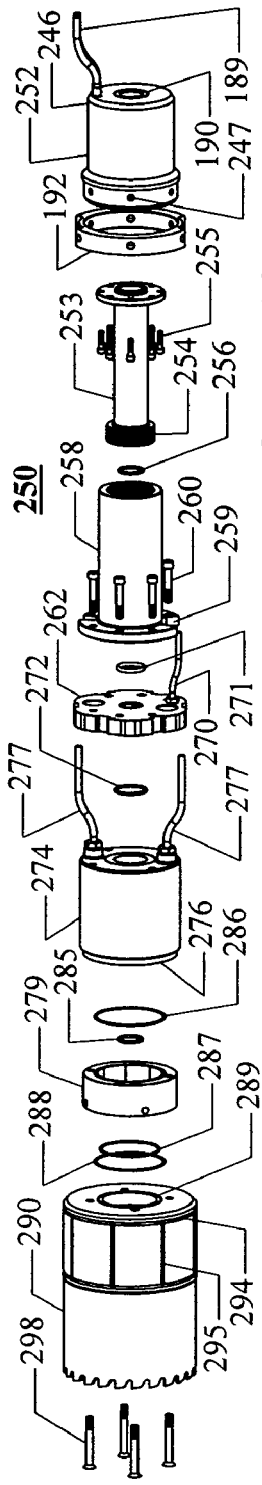
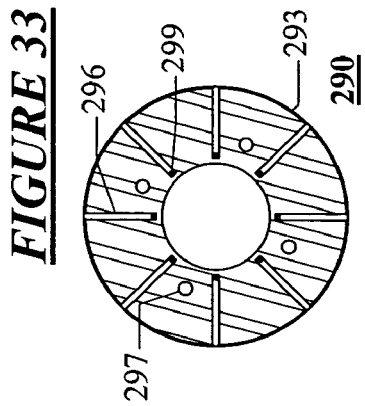
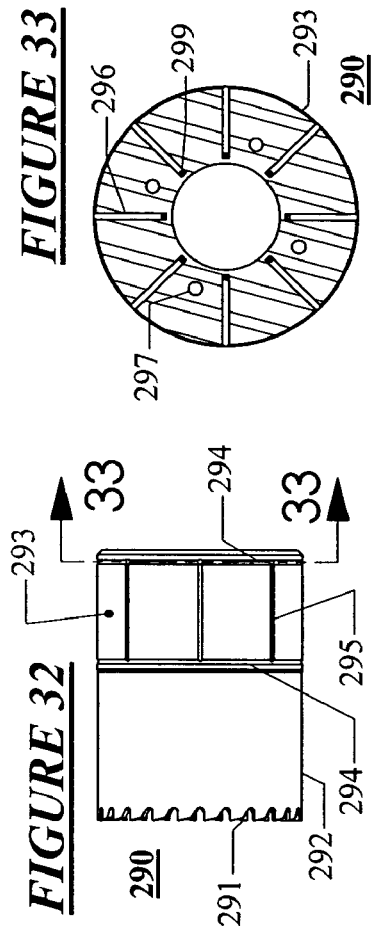
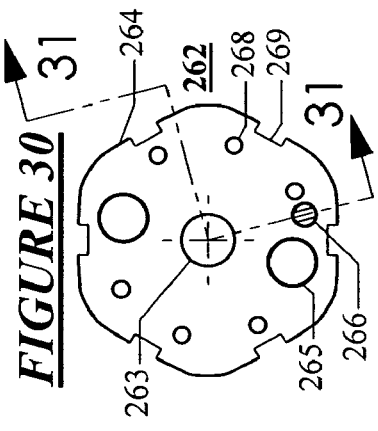
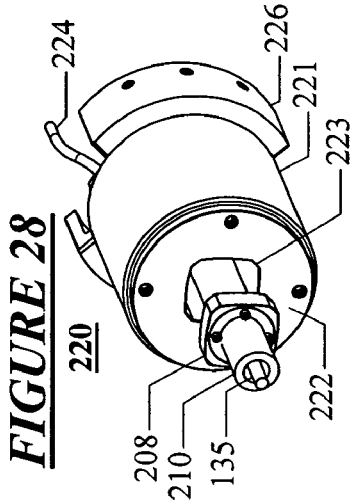
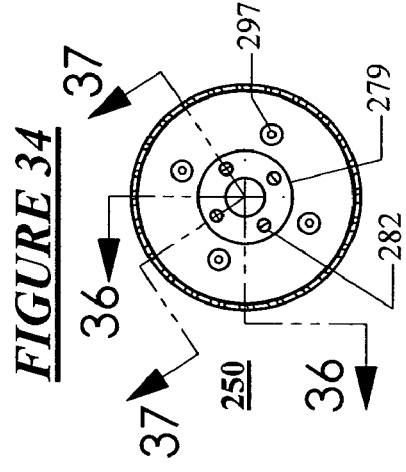

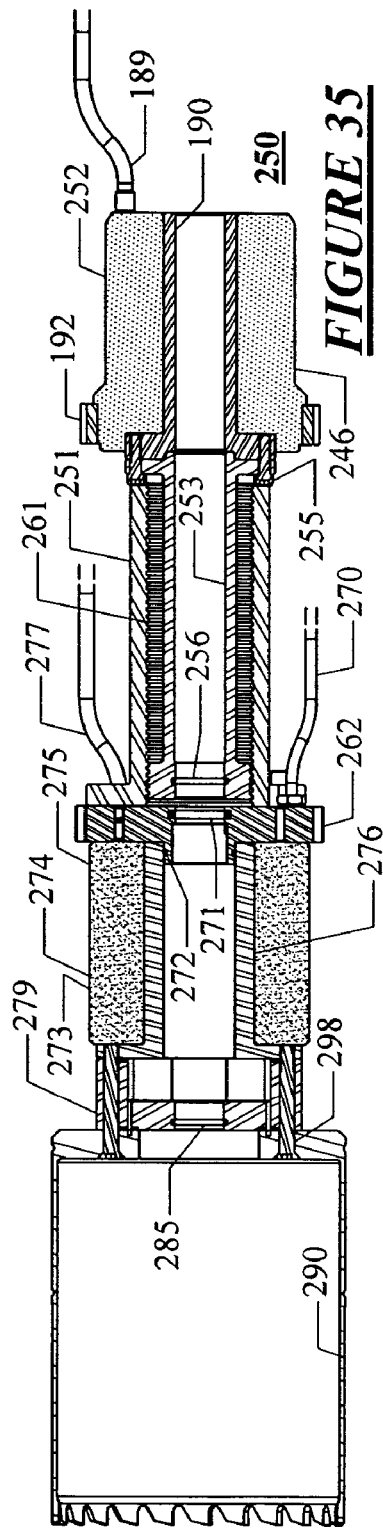

HOT TAP MACHINE

CROSS REFERENCE TO RELATED APPLICATIONS

The present application, pursuant to 35 U.S.C. 111(b), claims the benefit of the earlier filing date of provisional application Ser. No. 60/735,977 filed Nov. 10, 2005, and entitled "Hot Tap Machine."

BACKGROUND OF THE INVENTION

1. Field of the Invention

The present invention relates in general to a method and apparatus for cutting round holes into the walls of pipes under pressure. More particularly, the invention relates to a method and apparatus for using independently operated cutting means to holesaw a round hole into a pipe wall and to retain the resulting coupon.

2. Description of the Related Art

The hot tapping of pipes is a very old, established art. However, the machines which are currently in use for this purpose are only marginally satisfactory for critical work, such as steam lines or high pressure lines. The primary problems are related to operator safety, retention of the pipe coupon cut from the pipe, dealing with high pressure conditions, and the accuracy of the cut. Additionally, the existing machines are not sufficiently capable in their operation for dealing with vibrations, flow forces, or jamming. Major improvements are needed for subsea use, particularly for cases where operations must be conducted robotically below diver depths.

Traditional hot tap machines have used a holesaw with an integral rigidly concentrically mounted twist drill as a pilot. Coupon retention has been with spring wires anchored and recessed in the flutes of the twist drill or with Hydrotech's selectably engagable rotary bar mounted in a shank pocket of the twist drill and operated by a coaxial rod within the drill stem. Both approaches fail to maintain adequate coupon retention and alignment in the presence of high flow forces in the pipe, and the flute-mounted spring wires are highly unreliable.

Traditional hot tap machines mount their motors externally and extend their drive shafts through glands in a pressure containing housing. The friction from the glands is so high for high pressure conditions that often the shaft cannot be rotated. Additionally, the feed rate and cutting speed are fixed, while the extended shaft is laterally unstable and lacks adequate stiffness for avoiding shaft windup, axial and lateral vibrations, and excessive lateral deflections. The lack of stiffness is exacerbated by the interrupted cutting environment for the holesaw.

Due to their manually controlled operation, one of the most critical problems for conventional hot tap machines is the necessity for close operator proximity during cutting. In the event that the hot tap fitting and machine housing which are clamped around the pipe for supporting the cut leak or rotationally shift around the pipe axis, the operator is imperiled. Leakages of flammable fluids or live steam pose particularly severe hazards to personnel adjacent the hot tapping operation.

There is a critical need to address these problems with significant improvements in operator safety, machine stiffness and accuracy, machining rates, coupon retention, high pressure capability, operator feedback and adaptability to varying operational conditions while cutting, and remote operability.

A continuing need exists for a hot tap machine which is suitable for high pressure pipes and can be remotely operated, in order to promote operator safety.

Furthermore there is a need to improve the reliability of coupon retention for the hot tapping holesawing operation and to provide a means of maintaining coupon positional stability during the holesawing operation, particularly when the holesaw is completing its cut into the pipe wall.

Yet another critical need is a hot tap machine that is more rigid and has increased vibratory damping, so the pipe can be cut faster and more accurately. In addition, a hot tap machine which has independent variable speed drives for the center drill and the holesaw is also needed.

SUMMARY OF THE INVENTION

The invention contemplates a simple, adaptable device for solving the problems and disadvantages of the prior approaches discussed above. The present invention provides a rapid, reliable and accurate cutting of a hot tapped hole into a pipe by remotely controlled means. The hot tap machine of the present invention may be remotely attached to and detached from a preset hot tap fitting on the pipe to be cut. The present invention utilizes first and second coaxial independently controlled cutting systems mounted in a cartridge reciprocably contained within and extensible from a pressure containing housing to cut a circular window in the wall of a pipe. One aspect of the present invention comprises the use of the first cutting system to initially drill into the pipe with a center drill having an integral tap and then to tap the resulting center hole. The tap of the center drill is left engaged with the cut threads so that the first cutting system can be used to retain the pipe coupon.

Another aspect of the present invention is to use the second cutting system to utilize its holesaw to cut loose the pipe coupon subsequent to the cutting and tapping of the center hole.

A third aspect of the present invention is to independently control the rotational speed and the axial feed of both of the cutting systems independently.

Another aspect of the invention is to make the rotational speed and the axial feed of the first, center drill cutting system directly proportional during the tapping of the center hole in order to accurately cut tapped threads.

A further aspect of the present invention is to provide a hydrostatic bearing between an outside cylindrical surface of the holesaw of the second cutting system and a bore of the hot tap fitting.

An additional aspect of the present invention is to provide a means to rigidly affix the cartridge containing the first and second cutting systems to the interior wall with a latch when the cartridge is reciprocated into position to initiate cutting the pipe.

A further aspect of the invention is to provide selectably remotely operable collet means to disengage and to reengage the first cutting means from its center drill in the event of a machine operational problem. Another object of the present invention is to arrange the center drill with its integral tap of the first cutting system to cut when rotated in a first direction with the holesaw of the second cutting system to cut when rotated in a second, opposed direction so that the holesawing operation will not tend to disengage the tap of the center drill.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is an oblique view of the housing assembly of the machine, in which the hot tap machine cartridge is shown in its retracted position within the housing.

FIG. 2 is an oblique view of a typical hot tap fitting assembly on a pipe.

FIG. 3 is a longitudinal partial sectional view of the housing assembly of FIG. 1, wherein the hot tap machine cartridge is shown in its retracted position.

FIG. 4 is a longitudinal sectional view of the housing assembly corresponding to FIG. 3, but with the hydraulic extender cylinder and the hot tap machine cartridge omitted.

FIG. 5 is a view of the latch assembly of the hot tap machine cartridge taken from the extender cylinder end.

FIG. 6 is a longitudinal quarter sectional view of the latch assembly taken on the line 6-6 of FIG. 5, wherein the latch assembly is retracted.

FIG. 7 is a longitudinal quarter sectional view of the upper half of the latch assembly corresponding to FIG. 6, but with the latch assembly extended.

FIG. 8 is a side view of the hot tap machine cartridge with the latch assembly removed.

FIG. 9 is an end view of the carrier tube of the hot tap machine cartridge taken from the end of the tube at which the holesaw is mounted.

FIG. 10 is a longitudinal sectional view of the carrier tube of FIG. 9.

FIG. 11 is a transverse sectional view of the housing assembly of FIG. 4 taken on the sectional line 11-11 in that figure. FIG. 11 shows the profile of the split ring connector and the housing liner internal to the housing assembly.

FIG. 12 is a cross-sectional view of the hot tap fitting assembly of FIG. 2 taken transverse to the pipe longitudinal axis and through the longitudinal branch axis of the hot tap fitting.

FIG. 13 is a longitudinal sectional view of the hot tap machine cartridge of FIG. 8.

FIG. 14 is a side view of the internal assemblies of the hot tap machine cartridge of FIG. 8.

FIG. 15 is a side view of the center drill assembly, which is one of two major parts of the internal assemblies of FIG. 14.

FIG. 16 is a side view of the center drill assembly corresponding to FIG. 15, but taken at 90° from the direction of view of FIG. 15.

FIG. 17 is an oblique exploded view of the center drill assembly of FIGS. 15 and 16.

FIG. 18 is a longitudinal sectional view of the collet closer assembly and its comounted drill coolant inducer assembly.

FIG. 19 is a longitudinal sectional view of the center drill lead screw assembly.

FIG. 20 is a longitudinal sectional view of the collet assembly engaged with the center drill.

FIG. 21 is an oblique exploded view of the annular shaft clamp.

FIG. 22 is an oblique exploded view of the annular shaft antirotation clamp.

FIG. 23 is cross-sectional view of the housing assembly of FIG. 8 taken on the section line 23-23, wherein the actuation means of the hot nut connector assembly is shown.

FIG. 24 is an end view of a latch dog of the latch assembly of FIGS. 5, 6, and 7.

FIG. 25 is a semi-exploded view of the housing cap assembly for the housing assembly of FIGS. 3 and 4.

FIG. 26 shows a longitudinal semi-exploded sectional view of the drill shaft support bearing assembly.

FIG. 27 is an axial end view of the center drill guide plate.

FIG. 28 is an oblique semi-exploded view of the center drill drive arrangement.

FIG. 29 is an oblique exploded view of the hole saw drive assembly, which is the second of two major parts of the internal assemblies of FIG. 14.

FIG. 30 is an axial end view of the hexagonal drive motor guide disk taken from the outer end.

FIG. 31 is a longitudinal three quarter section of the drive motor guide disk of FIG. 30 taken along the line 31-31 in FIG. 30.

FIG. 32 is a side view of the holesaw.

FIG. 33 is a transverse cross-sectional view of the holesaw taken along the line 33-33 of FIG. 32.

FIG. 34 is a view of the open end of the holesaw drive assembly of FIG. 28, taken from the holesaw end.

FIG. 35 is a longitudinal section through the holesaw assembly.

FIG. 36 is a longitudinal quarter section taken on line 36-36 of FIG. 34 through the radial flow port of the holesaw.

FIG. 37 is a longitudinal quarter section taken on line 37-37 of FIG. 34 through the return flow port of the holesaw.

FIG. 38 is an oblique side view of the center drill.

FIG. 39 is an oblique side view of an alternative embodiment of the center drill.

FIG. 40 is an oblique view of the center drill threadedly engaged with a coupon of pipe cut free of the pipe by the holesaw of the hot tap machine.

FIG. 41 is a partial longitudinal cross-sectional view of the hot tap machine engaged with the hot tap fitting assembly, wherein the hot tap machine is latched into position to commence cutting the pipe held by the hot tap fitting.

FIG. 44 is a partial longitudinal section of the upper end of the center drill assembly 121 showing details of the drill shaft support bearing assembly in the upper end of the drill drive shaft assembly.

DESCRIPTION OF THE PREFERRED EMBODIMENTS

Figure 42:
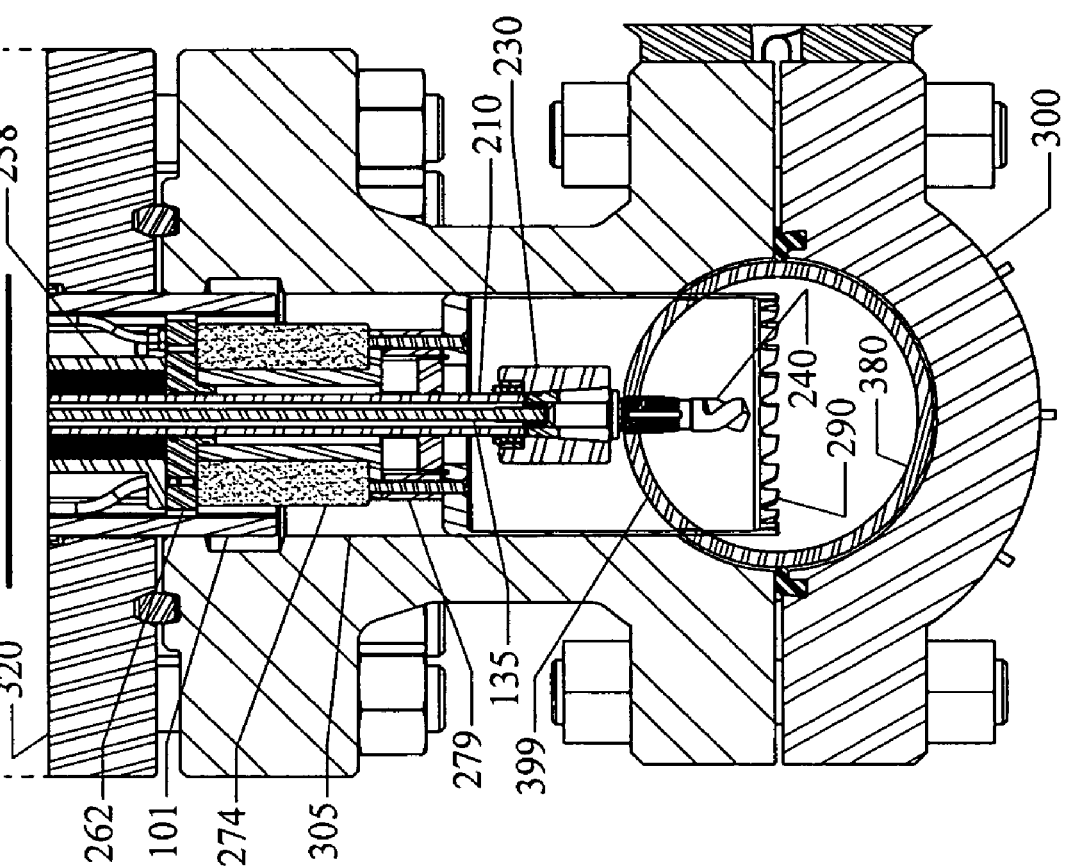
FIG. 42 is a partial cross-sectional view of the hot tap machine and hot tap fitting after the center drilling operation is complete and the tap of the center drill is engaged fully with the pipe.

The present invention provides a hot tap machine having independent rotary drives that can be remotely operated for the center drill and the holesaw. The hot tap machine of the present invention also has improved vibratory damping and coupon stability and retention.

The present invention is shown in the attached figures and is described herein in reference to those figures. During operation, the machine cartridge holding the machine internal assemblies of the improved hot tap machine of the present invention is, except for its controls and external support systems, entirely contained within its pressure containment housing and the hot tap fitting mounted on the pipe to which the housing is sealingly attached, as indicated in FIG. 41. The machine cartridge can be inserted selectably into and retracted from the hot tap fitting.

A major principle in the operation of the present invention is the independence of the center drilling operation and the pipe coupon cutting operation. The hot tap machine 10 does not conduct these two coaxial cutting operations simultaneously. Rather, initially the center drill assembly using its center drill with an integral tap is used to make a first penetration into the pipe by cutting a center hole, thereby establishing pressure communication between the interior of the pipe and the pressure containing chamber holding the machine. Following the drilling, the center drill is advanced further into the pipe, causing it to tap the pipe and thereby establish a rigid connection thereto. After completion of the drilling and tapping operation, the holesaw assembly cuts its annular groove hole into the pipe independently of the center drill. When the pipe coupon is severed from the pipe, both the coupon, held by its tapped threads, and the hot tap machine cartridge are withdrawn from the hot tap fitting. This coupon retention means provides a major improvement in operational reliability.

The present invention is provided with several features which increase the stiffness of the hot tap machine 10 and reduce its vibration, thereby improving accuracy and speed of cutting. Additionally, avoidance of a rotating seal on the machine housing improves reliability and safety.

The materials of construction of the hot tap machine of the present invention are primarily high strength low alloy steel, with the drill drive shaft and the hydraulic and electrical connectors being stainless steel. The O-rings are nitrile rubber or a similar elastomer not sensitive to decompression damage. The electric and hydraulic motors are modified commercially available equipment which typically will use a variety of materials, including cast iron, copper, and stainless steel.

Referring to FIG. 1, the hot tap machine 10 of the present invention is shown with its tubular housing assembly 11 reciprocably mounting within its bore the machine cartridge 100. The external remote support systems, including control and both hydraulic and electrical power sources and a liquid coolant source, are not shown herein, but are well understood by those skilled in the art. Longitudinal partial cross-sectional drawing FIG. 3 shows the positioning of the machine cartridge 100 when the machine is in its retracted position preparatory to attachment to a hot tap fitting assembly 300, such as shown in FIG. 2.

The Housing Assembly 11

FIG. 4 shows a longitudinal cross-sectional view of the housing assembly 11 without its associated extender cylinder 57, its latch assembly 70, and the machine cartridge 100. The function of the housing assembly 11 is to house and reciprocate the machine cartridge 100 and to prevent the pressure internal to the pipe 380 from escaping to the atmosphere when the hot tap machine 10 cuts into the pipe. The axially reciprocable piston rod 59 of extender cylinder 57 is attached to the latch assembly 70, which is in turn attached to the machine cartridge 100 so that the cartridge can be axially reciprocated within the housing assembly 11.

Housing assembly 11 consists of a housing tube 12, a split ring connector 20, a housing cap assembly 24, a hot nut connector female half 40, and extender cylinder 57, and a latch assembly 70. The housing tube 12 is an elongated heavy wall right circular cylindrical tube having a weld preparation at a first end and an opposed second upset flanged end 13. The flanged end 13 has an outwardly extending flange having a frustroconical face opposed to its distal transverse second end and suitable for engagement with split ring connector 20. The flanged end 13 also has a distal interior frustroconical face having a small angle with the longitudinal axis which is suitable for engagement with an annular seal ring 30. Close to the first end of the housing tube 12 is located an interior annular groove 14, which has an uniform diameter and frustroconical transition shoulders inclined to the longitudinal axis by large acute angles. A circumferential weld 15 at the first end of the housing tube 12 rigidly connects the housing tube to the nut hub 42 of the hot nut connector female half 40.

Figures 5, 6, 7, 11, 24:
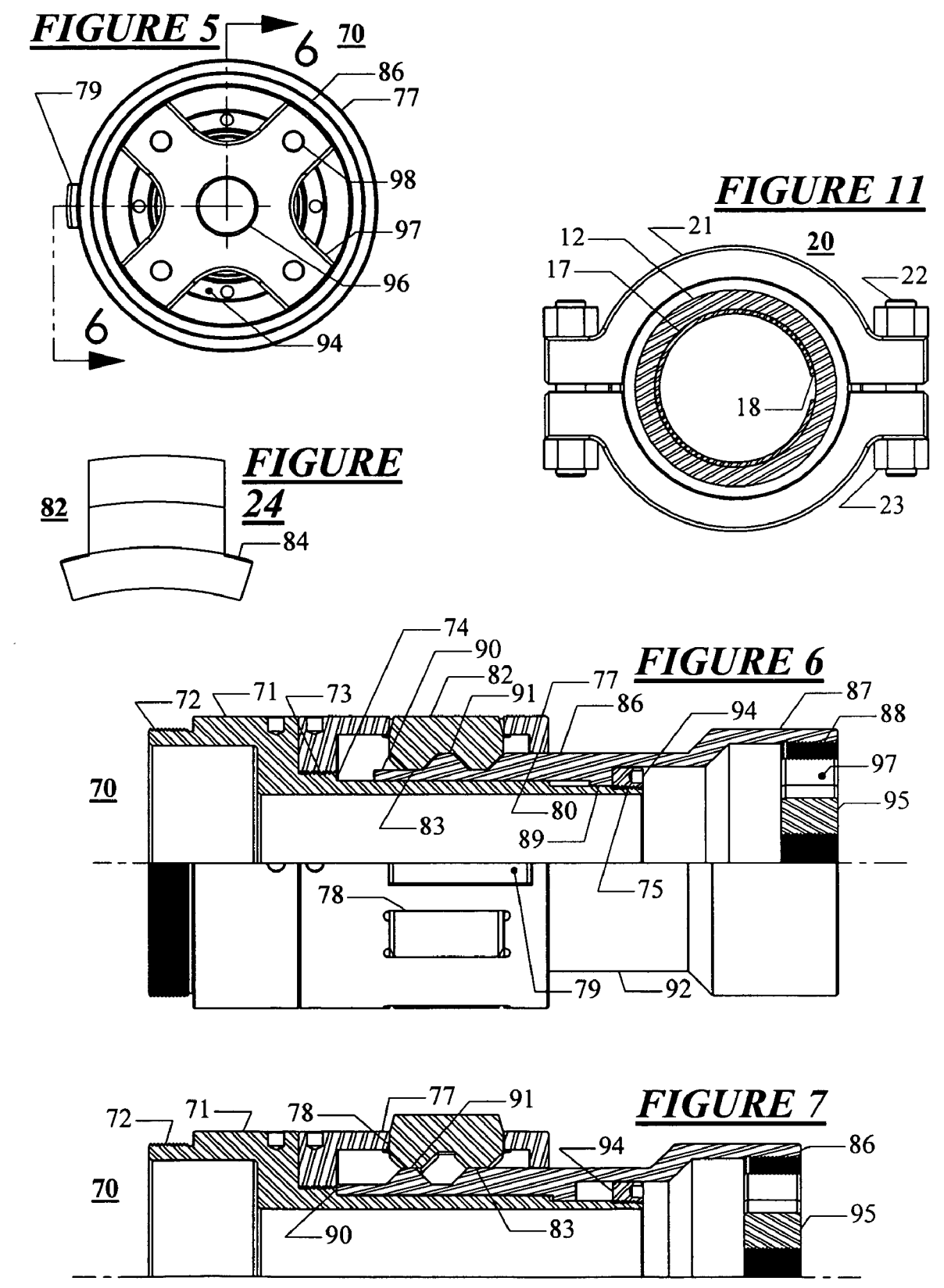

Closely fitted to the interior of the housing tube 12 is a sleeve housing liner 17. Housing liner 17 is of right circular cylindrical tubular construction, but only extends over an arc of about 340°, as can be seen in cross-sectional view FIG. 11. The arc ends of the housing liner 17 constitute longitudinal shoulders 18 which are a close fit to and engagable with the guide lug 79 of the latch assembly 70, thereby preventing rotation of the latch assembly 70 and its attached machine cartridge 100 relative to the housing tube 12. The housing liner 17 extends into the bore of the housing tube 12 from slightly inward of the seal groove of the flanged end 13 of the housing tube to just short of the interior annular groove 14. The housing liner 17 is attached to the housing tube 12 by a fillet weld (not shown) near the second end of the housing tube.

The split ring connector 20 is constructed similarly to the CON® connector offered by Reflange Inc. of Houston, Tex. The connector 20 is composed of two identical approximately half-rings 21, each having opposed outwardly projecting ears and an interior circumferential groove. The ears are provided with bolt holes so that the ring halves can be clamped together using studs 22 and nuts 23. The interior groove has spaced-apart antisymmetrical frustroconical faces which match the slopes of and interact with the frustroconical face of the flanged end 13 of the housing tube 12 and with the similar opposed exterior frustroconical face of the flange 26 of the housing cap disk 25 of the housing cap assembly 24. Tightening the nuts 23 of the connector 20 urges the housing cap disk 25 and the housing tube 12 together.

The housing cap assembly 24, shown in longitudinal cross-section in FIG. 4 and in an exploded view in FIG. 25, consists of the housing cap disk 25, multiple hose connectors 28 and electrical connectors 29, and an annular seal 30. The annular seal 30 is constructed similarly to the CON® Seal Ring in that it has antisymmetrical exterior frustroconical faces and a cylindrical through bore. The housing cap disk 25 is a right circular cylindrical disk having an outwardly extending flange similar to that of the flanged end 13 of the housing tube at a first end and a through bore 27 having a coaxial female thread 27 at the second end of the disk. An annular groove with a frustroconical outer circumferential face is located on the first end of the cap disk 25. The frustroconical groove face is comatable with the annular seal 30, as is the frustroconical inner face of the flanged end 13 of the housing tube 12. Tightening the split ring connector 20 urges the annular seal 30 into sealing engagement with both the housing tube 12 and the housing cap assembly 24.

Multiple drilled through holes tapped on both ends are located in a regular circular pattern concentric with the longitudinal axis of the housing cap disk 25 and radially inwardly from the seal groove on its first end. Opposed pairs of either hydraulic hose connectors 28 or pressure and water resistant marine electrical connectors 29 are mounted in each of the holes of the cap disk 25, with wiring connections (not shown) between the opposed electrical connector 29 pairs. Suitable hydraulic hoses (not shown) are used to interconnect the hydraulic connectors 28 on the first end of the cap disk 25 to the coolant delivery circuitry and hydraulic motors of the machine cartridge 100. Suitable pressure and fluid resistant electric cables (not shown) are used to interconnect the electrical connectors 29 on the first end of the cap disk 25 to the sensors and electric motors of the machine cartridge 100. As shown in FIG. 29, one interior hydraulic hose connector is attached to a line which has an open inlet just outward of the drive motor guide disk 262 of the holesaw assembly 250 of the machine internal assemblies 120. This line serves as a pump suction line for a coolant circulation pump (not shown) which is located external to the housing assembly 11.

The hoses and cables inside the housing tube 12 and extending between the machine cartridge 100 and the housing cap assembly 24 are arrayed in a helical pattern about the rod 59 of the extender cylinder 57 so that the extension and retraction of the cylinder does not prevent connectivity with the machine cartridge 100. Extending the rod 59 of the extender cylinder 57 only reduces the diameter and elongates the helix. Suitable cabling and hydraulic hoses connect to the connectors 28 and 29 on the exterior second end of the housing cap disk 25 so that remotely located external hydraulic controls and electrical controls (not shown) can be used to operate the hot tap machine 10. The opposed pairs of electrical connectors 29 could be replaced by suitable bulkhead connectors.

The hot nut connector pair consisting of hot nut connector female half 40 and male upper connector socket 350 are fully described in U.S. Pat. No. 6,764,110, but a brief physical description is provided herein. The hot nut connector pair can be remotely operated in order to selectably connect and disconnect the connector halves. Refer to FIGS. 1, 4, and 23 for the connector female half 40 and to FIGS. 2 and 12 for the male connector half. The hot nut connector female half 40 primarily consists of a selectably heatable and rotatable hot nut 41, a nonrotating nut hub 42, and hydraulic cylinder rotational means for rotating the nut relative to the hub.

The cylindrical hot nut 41 has multilead interrupted female threads in a first end of its interior bore, a selectably operable electrical heater jacket on its exterior, and a transverse inwardly projecting interior shoulder at its second end. The nut hub 42 is cylindrical with a through bore, a weld preparation at its first end for annular weld 15, and an outwardly projecting centrally located transverse shoulder. At its second end, the nut hub 42 has a reduced diameter stabbing extension 43 upon which are mounted a seal 44 and a stabbing nose 46.

The seal 44 is similar in construction to seal 30, but with the addition of an intermediate outwardly projecting annular ring having an external frustroconical face which serves to guide the hub 42 of the female connector 40 into the converging bores 354, 353, 352 of the male connector 350. The cylindrical stabbing nose 46 provides interior support to the seal 44 and further aids in establishing connector alignment.

A cylinder mount bracket 47, consisting of opposed identical split ring halves joined by screws 53 and nuts 54, is clamped around the outside of the first end of the hub 42. Each split ring half of the cylinder mount bracket 47 has a radially projecting jaw-type yoke which mounts the body of a hydraulic cylinder 50 by means of an opposed pair of cylinder trunnion pins 51. The pins 51 and the bracket 47 are arranged so that the axes of the hydraulic cylinders 50 are parallel and approximately tangential to the nut hub 42. A rod mount bracket 48, having similar construction to that of the cylinder bracket 47, is clamped to the exterior of the hot nut 41 at the second end of the hot nut. Opposed rod pivot pins 52 connect the end of the rod of cylinder 50 to the rod mount bracket 48. Extending the rods of the cylinders 50 rotates the hot nut so that it moves in a tightening direction, while retracting the rods loosens the hot nut.

Upper connector socket 350, mounted on the outer end of the tee branch of the hot tap fitting assembly 300, is a cylindrical sleeve having a weld preparation at a first, inner end and an enlarged second end for accommodating stabbing engagement by the hot nut female connector half 40. From its first end, socket 350 has a primary bore 351, a stabbing nose alignment bore 352, a frustroconical seal bore 353, and an outer alignment bore 354. All of the bores 351, 352, and 354 are right circular cylindrical, progressively increase in size from the first end of socket 350, and are joined by frustroconical transition sections. The primary bore 351 is a slip fit to both the hole saw 290 and the carrier tube 101 of the machine cartridge 100. The stabbing nose alignment bore 352 is a close slip fit to the stabbing nose 46, and the outer alignment bore 354 is a close slip fit to the stabbing extension of the hot nut female half 40.

For stabbing the hot nut connector female half 40 into the upper connector socket, the cylinders 50 or the connector are retracted so that the threads of the hot nut 41 are their untightened position. The hot nut connector female half 40 is aligned so that its threads are able to pass in the gaps between the male interrupted threads 356 of the upper connector socket 350. When the nut hub 42 of the connector half 40 is fully stabbed into the upper socket connector 350, the seal 44 fully abuts both the seal bore 353 of the socket 350 and a similar frustroconical surface on the second end of the nut hub 42, thereby permitting sealing between the two sides of the connection. The multilead interrupted male threads 356 of the exterior surface of the socket 350 are axially positioned so that, when female connector half 40 is fully stabbed, the female threads of the hot nut 41 are adjacent to and engagable with threads 356 by rotating hot nut 41 relative to both the nut hub 42 and the socket 350. This rotation is effected by extending the cylinders 50 on the female half 40 of the connection.

To tighten the hot nut connector threads, the connection is first tightened by the cylinders 50, followed by selectably heating the nut 41, and finally retightening the heated nut. Loosening the connection involves first heating the nut 41 and then loosening and disconnecting the threads by retracting the cylinders 50.

Extender hydraulic cylinder 57 is a double-acting single-ended unit which has a tubular body 58 having a coaxial male threaded nose which is threadedly engaged with the female thread at the second end of the bore 27 of the housing cap disk 25. Sealing is provided by an O-ring (not shown) or similar means between the nose of the cylinder body 58 and the housing cap disk 25. At the end of body 58 opposed to the threaded nose, a rod position sensor 61 is provided. Port fittings 60 at either end of body 58 provide connection to remote external hydraulic controls (not shown). The coaxial extender cylinder rod 59 extends into the interior of the housing tube 12 through the bore of housing cap assembly 24, where it is connected to the latch assembly 70, which is in turn attached to the carrier tube 101 of the machine cartridge 100.

Latch assembly 70, shown in detail in FIGS. 5, 6, and 7, is configured to slide within the housing liner 17 of the housing tube 12 with a slip fit. Latch assembly 70 is coaxially threadedly attached at its outer end to extender cylinder rod 50 and at its inner end to the upper end thread 107 of the carrier tube 101 of the machine cartridge 100. When the latch dogs 82 of the latch assembly 70 reach latch groove 14 of the housing tube 12 of the housing assembly 11, the latch dogs are cammed out so that the latch assembly engages the latch groove and thereby anchors the machine cartridge 100 attached to the latch assembly to the housing assembly.

The latch assembly 70 consists of latch core 71, latch dog cage 77, the latch dogs 82, latch actuator 86, keeper nut 94, and the extender rod attachment nut 95. Latch core 71 is of stepped right circular cylindrical construction. The outer surfaces of latch core 71 include sequentially external male first end thread 72, a downwardly facing transverse shoulder, a short first enlarged diameter section, an upwardly facing transverse shoulder leading to a reduced diameter intermediate male thread 73, a second upwardly facing transverse stop shoulder 74, an elongated second smaller diameter cylindrical section, another upwardly facing transverse shoulder, a short third cylindrical section, and a male neck thread 75 at the second end of core 71. The bore of latch core 71 has, from its first end, a short first cylindrical section, a downwardly facing transverse shoulder, and an elongated through bore.

The latch dog cage 77 is also of stepped right circular cylindrical construction with an uniform outer diameter except for a radially protruding guide lug 79 having parallel lateral surfaces which are a slip fit with the longitudinal shoulders 18 of the housing liner 17 of the housing tube 12. The outer diameter of the latch dog cage 77 is the same as the maximum diameter of the latch core 71. The axial length of the guide lug 79 is approximately half that of the latch dog cage 77, while the outer diameter of the lug is a slip fit to the bore of the housing tube 12. The position of the guide lug 79 is intermediate to the length of the latch dog cage 77, but closer to its outer end.

The interior side of the dog cage 77 has at its lower end a female thread engaged with the intermediate thread 73 of the latch core 71. An upwardly facing internal transverse shoulder adjoins the thread at the first end of the latch core, where it connects to a central internal cylindrical face that extends most of the length of the dog cage. The length of the thread at the first end of the dog cage 77 is such that the upwardly looking internal transverse face of the dog cage is coplanar with the transverse stop shoulder 74 of the latch core 71. At the second end of the dog cage 77 is located a relatively short inwardly projecting transverse shoulder having a bore 80. Radially extending multiple rectangular windows 78 are regularly circumferentially spaced intermediate to the length of the central internal cylindrical surface of the dog cage 77. Short arcuate segments are located adjacent the corners of the windows 78 as a consequence of milling the windows.

The latch dogs 82 can be best seen in FIGS. 6, 7, and 24. The latch dogs 82 are a slip fit to the windows 78 of the latch dog cage 77. Seen in longitudinal cross-section, the latch dogs are symmetrical about a transverse midplane and have a cylindrical outer face, a transverse intermediate end shoulder, a short frustroconical outer end shoulder slightly inclined to the intermediate shoulder, and an internal shoulder inclined at 45° to the intermediate end shoulder. The latch dogs 82 have a cylindrical inner face having a symmetrical central groove. The central groove has a cylindrical midsection adjoined by inwardly opening 45° shoulders, with the cylindrical midsection having the same diameter as the inward edge of the transverse intermediate end shoulder. The central groove separates the cylindrical inner face of the latch dogs 82 into two symmetrical inwardly projecting lands 83.

As seen in the end view of FIG. 24, the lateral sides of the latch dogs 82 are parallel from the outer cylindrical surface to the diameter of the cylindrical portion of the central groove on the inner cylindrical face of the latch dogs. These parallel faces have slip fits to the lateral sides of the latch dog windows 78 of the dog cage 77.

Symmetrical ears 84 extend a short distance outwardly in a circumferential direction from the parallel lateral faces of the latch dogs. The exterior cylindrical surface of the ears 84 has the same diameter as the inner intermediate cylindrical surface of the dog cage 77. The outer cylindrical surface of the latch dogs 82 has the same diameter as the bore of the groove 14 of the housing tube 12, while the diameter of the transition between the intermediate end shoulder and the frustroconical outer end shoulder is the same as the outer diameter of the dog cage 77. A latch dog 82 can be reciprocated in a radial direction within its window 78 of the latch dog cage 77, but is retained within the latch dog cage by the abutting of its ears 84 on the inner central cylindrical surface of the latch dog cage.

The latch actuator 86 is a sleeve which has camming surfaces on its exterior first, lower end and an internal female connection thread at its second, upper end. On its inner side, the latch actuator 86 has a first bore extending approximately half of its length to a transverse inwardly extending stop ring 89 having a smaller inner diameter than the first bore. The diameter of the first bore is a slip fit to the second exterior cylindrical section of the latch core 71, while the inner diameter of the stop ring 89 is a slip fit to the third exterior cylindrical section of the latch core. Sequentially above the stop ring 89 is an upwardly facing transverse shoulder, a larger diameter second cylindrical section, an upwardly facing frustroconical transition shoulder, and an upper end cylindrical section having a female connection thread 88 at its distal upper end. The frustroconical shoulder and the final cylindrical section constitute an outer socket 87.

On its exterior the latch actuator 86 has sequentially from its lower transverse end a cylindrical reduced diameter nose 90, an enlarged diameter land 91 consisting of a central cylindrical surface cojoined on both its upper and lower sides by symmetrical 45° shoulders, and a second short cylindrical section having the same diameter as the nose 90. Sequentially above the second short cylindrical section is a downwardly facing 45° transition slope, an extended central cylinder 92, another downwardly facing transition slope, and the enlarged upper end cylindrical section housing the outer socket 87. The diameter of the land 91 is the same as that of the central cylinder 92, and both are a slip fit to the bore 80 of the latch dog cage 77. The configuration of the land 91 and the groove on the upper side of the land is such that the inwardly projecting lands 83 of the latch dogs 82 can nest on either side of the land 91 whenever the stop ring 89 of the latch actuator abuts the keeper nut 94.

A right circular cylindrical keeper nut 94 has internal female threads threadedly engagable with the neck thread 75 of the latch core 71. The outer diameter of the keeper nut 94 is a slip fit with the second interior cylindrical section of the latch actuator 86.

As best seen in FIG. 5, the extender rod attachment nut 95 is a right circular cylindrical annular disk having a male thread on its exterior cylindrical face and a female threaded bore 96. Multiple outwardly opening regularly spaced through notches circumferentially positioned around the periphery of the nut 95 serve as cable passages 97 to permit electrical cables and hoses to extend through the interior of the latch assembly 70 to the machine cartridge 100. Multiple equispaced spanner socket holes 98 are parallel to the longitudinal axis of the nut 95 and offset outwardly therefrom.

The Machine Cartridge 100

The machine cartridge 100 consists of the coaxial primary components the carrier tube 101 and the machine internal assemblies 120, which in turn consists of the center drill assembly 121 and the holesaw assembly 250. The machine internal assemblies 120 of the machine cartridge 100 perform the cutting operations which result in the removal of the pipe coupon 399 from the pipe 380 which is sealingly gripped by the hot tap fitting 301.

The carrier tube 101 is most clearly seen in FIGS. 8, 9, and 10. The longitudinal sectional view in FIG. 10 is taken on a vertical midplane of symmetry. The carrier tube 101 is an elongated tube having a constant diameter right circular cylindrical tube outer surface 102 which is a slip fit to both the bore of the housing liner 17 of the housing tube 12, the primary bore 351 of the upper connector socket 350, the bore of the gate valve body 321, the neck bore 341 of the connector hub 340, and the neck bore 305 of the hot tap fitting 301. The lower end of carrier tube 101 has an internal relatively short symmetrical hexagonal guide section 103 which is coaxial with the outer cylindrical surface 102. As best seen in FIG. 9, the surfaces of the hexagonal guide section 103 are parallel to the longitudinal axis of the carrier tube, and the corners of the hexagon are slightly rounded. The main portion of the interior of the carrier tube 101 is a coaxial right circular cylindrical bore 106, and a female upper end thread 107 is located at the upper end of the cylindrical bore 106. Thread 107 is threadedly engaged with the male first end thread 72 of the latch core 71 of the latch assembly 70 for the assembled hot tap machine 10.

Referring to FIGS. 8 and 10, multiple sets of holes 108, 109, 110, and 112 symmetrical about the vertical longitudinal midplane are shown. All of the holes are countersunk for flathead screws 113, 114, 115, and 116. Six coplanar holes 108 at 60° spacings are located at approximately one quarter of the length from the hexagonal end of the carrier tube 101 and serve to mount screws 113 which support the hole saw lead screw drive motor 252. Six coplanar holes 109 in two opposed sets of three at 30° spacings symmetrical about the horizontal midplane are located at approximately midlength and serve to support the screws 114 mounting the spinner motor anchor 226 holding the center drill spinner motor 220.

Six coplanar holes 110 at 60° spacings are located at approximately two thirds of the length from the hexagonal end of the carrier tube 101 and serve to mount screws 115 which support the center drill lead screw feed motor 187 by threadedly engaging into the drilled and tapped mounting screw holes 194. Two opposed sets of four equispaced holes, located on the horizontal midplane centered at approximately 80 percent of the length from the hexagonal end of the carrier tube 101, mount screws 116 which support the antirotation guide 122 for the center drill assembly 121.

The Center Drill Assembly 120

The center drill assembly 121 of the machine internal assemblies 120 is shown in FIGS. 13, 14, 15, 16, and 17. The primary components of the center drill assembly 121 consist of the antirotation guide 122, the collet closer assembly 124, the drill coolant inducer 150, the center drill lead screw assembly 160, the shaft clamp 200, the shaft torque transfer clamp 208, the drill drive shaft 210 and its drill shaft support bearing assembly 212, the drill spinner motor 220, the spinner motor anchor 226, the collet assembly 230, and the center drill 240. These components are coaxially mounted in the cylindrical bore 106 of the carrier tube 101. The drill coolant inducer 150, the center drill lead screw assembly 160, and the drill spinner motor 220 all have through holes to accommodate the drill drive shaft 210. The purpose of the center drill assembly 120 is to feed a rotating cutter, in this case a drill 240, into a workpiece (namely the pipe 380). Herein, the term "speed" is used to refer to the rotational speed of the shaft carrying the cutter, while the term "feed" refers to the axial rate of movement of the cutter into the workpiece. The terms speed and feed are also applicable to the holesaw.

The center drill assembly 121 utilizes a hollow drill drive shaft 210 through which a collet drawbar 135 extends. At the outer end of the drive shaft 210, shown on the right in FIGS. 13 to 17, the collet closer assembly 124 and drill coolant inducer 150 are positioned, while on the inner end of the drive shaft, the collet assembly 230 and center drill 240 are positioned.

The antirotation guide 122 consists of a short, thin wall right circular cylindrical ring having two diametrically opposed mirror image guide arms extending parallel to the longitudinal axis of the guide to the inner end of the center drill assembly 121. The guide arms 123 are thin wall cylindrical segments each extending over an arc of approximately 30° and having radially extending edges. Multiple equispaced drilled and tapped holes are located on the horizontal midplane of the guide arms 123 for engagement with the antirotation guide mounting screws 116. The outer diameter of the ring of the antirotation guide 122 and the guide arms 123 is a slip fit to the cylindrical bore of the carrier tube 101.

The collet closer assembly 124 primarily consists of the collet closer body 125, a piston 130, and the collet drawbar 135, along with other associated hardware items. FIG. 18 shows a longitudinal cross-section of the collet closer. The collet closer 124 uses multiple Belleville springs 141 in series to normally tension the collet drawbar 135. The drawbar 135 is compressed to release the drill 240 held in the collet assembly 230 when hydraulic pressure is selectably applied to the single-acting piston 130.

The collet closer body 125 of the collet closer assembly 124 has a right circular cylindrical outer surface with a multistep internal bore housing the other components of the collet closer. On its inner end transverse face, the body 125 has a regular bolt hole circle of four drilled and tapped mounting holes 126. The bore 128 has three steps with transverse ends, with the step diameters decreasing from the inner transverse end towards the outer transverse end. A female O-ring groove near the inner end of the smallest bore step mounts rod O-ring 132. A hydraulic port 127 with a tapped outer end is offset from the longitudinal axis of the body 125 and extends from the outer transverse end to the transverse shoulder between the intermediate bore and the smallest bore. Hydraulic port 127 accommodates tube fitting 147 and its associated collet opening hydraulic line 148.

A radial notch inclined to the longitudinal vertical midplane of the collet closer body 125 is cut extending outwardly from the largest first bore through to the outer cylindrical surface, with the radial notch extending to the inner transverse end of the body. The notch is located midway between two of the tapped mounting holes 126. Additionally, the radial notch is intercepted by an outwardly opening full length notch cut parallel to the longitudinal axis of the body and in the outer cylindrical wall of the body 125. The radial notch and the exterior notch accommodate the coolant feed line 152 of the drill coolant inducer 150.

The piston 130 of the collet closer 124 is a right circular cylindrical sleeve having an outwardly extending intermediate flange. The exterior of the main sleeve portion of the piston body serves as a piston rod and is a close sliding fit to the smallest bore of the collet closer body 125, so that rod O-ring 132 seals between that smallest bore and the rod portion of the piston 130. A male O-ring groove is located on the outer cylindrical surface of the flange of piston 130. The male O-ring groove mounts piston O-ring 131, which seals between the flange of piston 130 and the intermediate bore of the collet closer body 125. The annular cavity between the outer transverse face of the flange of the piston 130 and the inwardly facing transverse face of the collet closer body 125 between the intermediate and the smallest bore is connected by the hydraulic port 127 to the tube fitting 147 and the collet opening hydraulic line 148.

The collet drawbar 135 has an elongated right circular cylindrical shank with a male engagement thread 136 at its inner end and an upset head at its outer end. The upset head has adjacent the shank and sequentially positioned outwardly from the shank a short enlarged cylindrical segment having a larger diameter than the thread 136, an outwardly extending transverse flange, and a reduced diameter neck having a distal male hex head for wrenching purposes.

An annular thrust type drawbar bearing 139 having an axially thin right circular cylindrical configuration surrounds the short enlarged cylindrical segment of the upset head of the drawbar 135 and abuts the inner transverse face of the flange of the upset head. Typically a needle thrust bearing would be used for drawbar bearing 139. Bearing 139 permits free rotation of the drawbar 135 within the nonrotating collet closer 124 when drilling is occurring. Abutting against the inwardly facing transverse shoulder of the bearing 139 is an annular spring reaction washer 140. Spring reaction washer 140 has a short cylindrical boss with a transverse outwardly extending flange at its outer end. The bore of the washer 140 is a sliding fit on the short enlarged cylindrical segment of the upset head of the drawbar 135.

A stack of multiple Belleville spring washers 141 arranged with the washers alternately facing opposite directions reacts in series against the spring reaction washer 140 on a first outer end of the stack and the spring abutment washer 144 on the other end of the stack. The spring abutment washer 144 is an axially thin annular disk with a thin outwardly extending annular sleeve at its outer periphery. The center hole of washer 144 is larger than the short enlarged cylindrical segment of the upset head of the drawbar 135, while the inner diameter of the annular sleeve is a sliding fit to the outer diameter of the Belleville springs 141 in order to permit the spring abutment washer to serve as a guide for the Belleville springs.

The drill coolant inducer assembly 150, seen best in FIG. 18, serves as a rotating fluid coupling to permit coolant injection into the interior of the rotatable drill drive shaft 210. The coolant inducer body 151 has a right circular cylindrical external body with an outwardly extending transverse flange located at its inner end. The flange of the coolant inducer body 151 has a bolt hole circle of four clearance holes parallel to the longitudinal axis of the coolant inducer body and matching the hole pattern of the tapped mounting holes 126 of the collet closer 124. The bore of the coolant inducer body 151 is symmetrical about its transverse midplane and has a central internal annular groove straddled by female O-ring grooves mounting first 157 and second 158 coolant inducer shaft O-rings. The O-rings 157 and 158 seal between the drill drive shaft 210 and the bore of the coolant inducer assembly 150.

An externally tapped radial coolant entry hole 155 extends from the central internal groove to the exterior of the main cylindrical outer surface of the coolant inducer body 151. The radial coolant entry hole 155 is oriented midway between two adjacent flange bolt holes 153, and the flange is notched adjacent the hole 155 in order to permit use of a 90° elbow fitting and a hydraulic tube constituting the coolant feed line 152.

The center drill lead screw assembly 160 primarily consists of antirotation sleeve 162, the drill translating nut 170, the drill nontranslating screw 180, and the drill feed motor 187, as seen in FIG. 19. These primary components of center drill lead screw assembly 160 all are of annular construction to permit drill drive shaft 210 to freely rotate through their central passages. The function of the center drill lead screw assembly 160 is to cause the drill drive shaft 210 to be reciprocably moved axially along the axis of the carrier housing 101 so that the drill 240 can be fed into and retracted from the pipe 380.

The drill antirotation sleeve 162, shown in FIG. 27, is a disk with a large central round through hole which clears the drill drive shaft 210, a right circular cylindrical outer periphery, and a concentric bolt hole circle on the same pattern as the tapped mounting holes 126 of the collet closer assembly 124. As seen in FIG. 27, the antirotation sleeve 162 has outwardly opening upper and lower external notches which serve as cable passages 163. The antirotation sleeve 162 also has two opposed guide slots 164 centered on the horizontal midplane of the sleeve. The radial edges of the guide slots 164 are a sliding fit to the corresponding edge faces of the guide arms 123 of the antirotation guide 122 of the center drill assembly 121. Interaction between the guide slots 164 of the antirotation sleeve 162 and the guide arms 123 of the guide 122 prevents the relative rotation during axial reciprocation of the antirotation sleeve 162 and its rigidly attached components relative to the antirotation guide 122 affixed to the carrier tube 101.

The drill translating nut 170 externally is a stepped right circular cylinder, where the larger diameter portion on the outer end of the nut is relatively short and serves as a flange. Four through bolt holes 172 through the short flange are parallel to and offset from the longitudinal axis of the nut 170 and are on the same coaxial bolt hole pattern as the tapped mounting holes 126 of the collet closer body 125. Internally, the drill translating nut 170 has female nut threads 174 extending most of its length from the inner end of the nut. At the outer end of the translating nut, the nut is counterbored to be a close fit to the exterior cylindrical surface of the ball bearing 216 of the drill shaft support bearing assembly 212. When the ball bearing 216 is pressed into the nut counterbore, it is retained by a second bearing retaining ring 217 which is engaged in an annular female snap ring groove 171 located in the counterbore adjacent the outer transverse end of the bearing.

Four screws 177 extend through the flange bolt holes 172 of the drill translating nut 170, the bolt holes of the antirotation sleeve 162, and the bolt holes 153 of the coolant inducer 150 and are threadedly engaged with the tapped mounting holes 126 of the collet closer body 125. The drill translating nut 170, the antirotation sleeve 162, the drill coolant inducer 150, and the collet closer assembly 124 are clamped together as a nonrotating but axially reciprocable unit.

The drill nontranslating screw 180 is a body of revolution which has a through bore 181 which clears the outer surface of the tubular drill drive shaft 210. The exterior of the drill nontranslating screw 180 has sequentially from its inner end a short concentric annular alignment nose, an outwardly extending flange, a thin wall central section, and a male threaded upset outer end with screw threads 182. The male threads 182 are threadedly engaged with the female nut screw threads 174 of the drill translating nut 170. Multiple bolt holes 183 in a regular circular pattern penetrate the flange of the drill nontranslating screw 180.

The drill feed motor 187 is adapted from a commercially available reversible hollow shaft servo motor having integral support bearings, an integral encoder, and integral gear reduction. The mounting flange of the motor body 188 and the power cord 189 connections to the motor body are modified so that the motor can fit inside the carrier tube 101 and be mounted therein by the radially installed screws 115. The power cords 189 are moved to exit from the rear face of the motor body 188, while the outwardly extending transverse mounting flange is reduced in diameter and provided with six regularly spaced radial tapped holes 194. Outwardly opening diametrically opposed cable passageways 193 are cut into the top and bottom of the motor mounting flange to permit the power cords 189 of the motor to pass by the front side of the motor and attach ultimately to the housing cap assembly 24 of the housing assembly 11. Additionally, the case of motor 187 is assumed to be oil-filled and provided with a pressure balancing membrane to permit equalization of the pressure in the motor case with its external environment. This approach and the apparatus for its accomplishment, while not shown herein, are well known for subsea motor applications.

The motor spindle 190 is provided with a transverse outwardly extending flange on its front face and a relatively large through bore which has ample clearance with the exterior of the drill drive shaft 210. A short pilot counterbore is provided on the front face of the spindle 190 for centralizing engagement with the annular alignment nose of the drill nontranslating screw 180. Multiple drilled and tapped bolt holes in a regular pattern identical to the mounting bolt holes 183 of the flange of the drill nontranslating screw 180 serve as nontranslating screw mounting holes 191. Mounting screws 184 are engaged through the mounting bolt holes 183 of the nontranslating screw 180 and threadedly engaged with the screw mounting holes 191 to rigidly clamp the nontranslating screw 180 to the motor spindle 190. Both the drill feed motor 187 and the nontranslating screw 180 are fixedly mounted to the interior bore 106 of the carrier tube 101 by the screws 115 engaged through holes 110.

Referring to FIGS. 17, 20, 21, and 26, the shaft clamp 200 can be seen both in an exploded view 21 and in application. The shaft clamp 200 is used to grip between a cylindrical shaft, in this case the drill drive shaft 210, and a cylindrical bore. The shaft clamp 200 consists of an outer ring 201, a first split ring 202, a second split ring 203, and multiple tightener screws 204. The outer ring 201 has a right circular cylindrical outer surface and two mirror image frustroconical interior surfaces having small angles with the part longitudinal axis converging toward the center of the outer ring.

First split ring 202 is an axially short ring having a straight bore, a radial gap, and an outer surface which has the same maximum diameter as the mouth of the frustroconical bores of the outer ring 201 when unstressed. The inner diameter of the first split ring 202 is approximately the outer diameter of the drill drive shaft 210 which is to be gripped. The angle of taper of the split ring 202 is the same as that of the frustroconical interior surfaces of the outer ring 201. Multiple regularly spaced drilled and tapped holes are positioned parallel to the longitudinal axis of the first split ring 202 and penetrate through the split ring. The second split ring 203 is identical to ring 202 except that unthreaded clearance holes are provided instead of tapped holes. Multiple tightener screws 204 are engaged through the clearance holes in the second split ring 203 and threadedly engaged in the tapped holes of the first split ring 202 when the rings are assembled into the tapered bores of the outer ring 201.

Frictional gripping between both the inner bore of the split rings 202 and 203 and the drill drive shaft 210 occurs when the split rings are wedged between the drive shaft and the outer ring 201 as a consequence of the rings being pulled together in their respective converging bores as the tightener screws 204 pull the split rings together. With sufficient wedging action, the outer ring 201 of the clamp is also sufficiently expanded so that frictional gripping will occur between the outer diameter of the outer ring and a cylindrical surface positioned adjacent to and outwardly of the outer ring. In FIG. 20, the shaft clamp 200 is shown gripping both the drill drive shaft 210 and the collet assembly 230 so that the shaft and the collet assembly are rigidly interconnected and the connection is able to transmit torque. In FIG. 26, the shaft clamp 200 interconnects the drill drive shaft 200 to the bore of the bearing support ring 214 of the drill shaft support bearing assembly 212.

The shaft torque transfer clamp 208 is constructed and operates similarly to the shaft clamp 200, but with the differences that the outer ring 209 of the clamp 208 is polygonal and that no gripping occurs on the outer polygonal face of the of the outer ring 209. The shaft torque transfer clamp 208 uses the same first 202 and second 203 split ring as for clamp 200. The polygonal outer ring 209 has the same internal profile as does the outer ring 201 of clamp 200. The outside of the polygonal outer ring 209 has a square transverse profile with rounded corners. The outer profile of outer ring 209 is a slip fit to the similar polygonal shaft bore 223 of the spinner motor shaft 222 for the drill spinner motor 220. The tightener screws 204 for the shaft torque transfer clamp 208 are identical to those for clamp 200. Torque transfer between the drill spinner motor 220 and the shaft torque transfer clamp 208 is by abutment with the corner shoulders of the polygonal exterior of outer ring 209 with the comating faces 223 of the spinner motor shaft 222. Torque transfer between the clamp 208 and the drill drive shaft 210 is by friction between the split end rings 202 and 203 and both the shaft 210 and the outer ring 209.

The drill drive shaft 210 is an elongated tube of constant cross section except for a short reduced outer diameter section at the outer end of the shaft to permit the spring abutment washer 144 to slide over the outer end of shaft 210 and abut against the outward transverse shoulder at the change of shaft diameter. Details of the outer end of the drill drive shaft 210 are shown in partial sectional view of FIG. 44. Drill drive shaft 210 has a ground right circular outer diameter and a through hole larger than the short enlarged cylindrical segment of the upset head of the drawbar 135.

Close to the outer end of the drill drive shaft 210 are a pair of diametrically opposed holes penetrating the shaft wall which serve as coolant entry ports 211 for the center drill coolant. The coolant flows to the exterior of the shaft 210 and through the coolant entry ports 211 to pass to the center drill through the annulus between the shaft 210 and the drawbar 135. A short right circular cylindrical annular filler sleeve 195 is press-fitted into the interior bore of the shaft 210 at its outer end on the outward side of the coolant entry ports 211. The bore of the filler sleeve 195 is a close fit to the short enlarged cylindrical segment of the upset outer end of the drawbar 135. A male O-ring groove mounting male O-ring 196 is on the outer cylindrical surface of the filler sleeve 195. O-ring 196 seals between the sleeve and the interior bore of the shaft 210. A female O-ring groove mounting female O-ring 197 is on the inner cylindrical surface of the filler sleeve 195. O-ring 197 seals between the filler sleeve 195 and the drawbar 135.

The drill shaft support bearing assembly 212 is shown in longitudinal cross-sectional views in FIGS. 26 and 44. Bearing support ring 214 is a short annular ring which is engaged by a shaft clamp assembly 200 on its inner bore so that it is clamped rigidly onto the drill drive shaft 210 at a desired location. The exterior surface is a stepped right circular cylinder which has an outwardly extending transverse flange on its outer end. A ball bearing 216 is press-fitted to the smaller outer diameter of the support ring and abutted on a first transverse side against the transverse shoulder at the change of outer diameter for the ring 214. The bearing 216 is retained on its second transverse side by snap ring first bearing retaining ring 215 engaged in a male groove on the inner side of the support ring 214. Snap ring second bearing retaining ring 217, shown uninstalled in FIG. 26 but in place (as seen in FIG. 44) in snap ring groove 171 of the drill translating nut 170 best seen in FIG. 19, is used to axially retain the outer ring of the bearing 216 when the bearing is pressed into the counterbore at the outer end of the drill translating nut.

The drill spinner motor 220 is shown in FIGS. 13 through 17. The drill spinner motor 220 is shown herein as a reversible hydraulic motor having a specially modified hollow shaft. The spinner motor 220 will use commercially available components, but also will require modifications to its body 221 and fluid inlet/outlet ports to permit its use inside the carrier tube 101 in the hot tap machine 10. The spinner motor is fitted with sensor means so that its rotational speed and position can be determined remotely by the operator of the hot tap machine 10. The sensor thereby permits determining axial feed depth of the tap flutes of the drill 240 during tapping of the pipe 380. The spinner motor body 221 has a drilled and tapped set of mounting holes on its outer transverse end. The spinner motor shaft 222 has an external transverse drive flange on the inner side of the motor and a hollow polygonal (square with rounded corners) through bore 223 which is a slip fit to the outer surface of the shaft torque transfer clamp 208. The slip fit between the polygonal shaft bore 223 and the torque transfer clamp 208 permits driving torque to be transferred from the motor 220 to the drill drive shaft 210 as the shaft is moved axially by the center drill lead screw assembly 160. The drill spinner motor 220 is provided with two hydraulic supply lines 224, an electrical communications cable for the motor sensor (not shown), and, if necessary, a hydraulic case drain line (not shown).

The spinner motor anchor 226 is an annular plate with diametrically opposed identical arcuate ears extending in an outward direction from the plate surface. The outer diameter of the motor anchor 226 is the diameter of the motor 220, while the through hole is larger than the small end of the motor shaft 222. The outer diameter of the arcuate ears is a slip fit with the bore 106 of the carrier tube 101. The flat face of the motor anchor 226 has a bolt hole circle corresponding to the mounting bolt hole circle on the outer transverse face of the body 221 of the drill spinner motor 220. Motor attachment screws 227 mount the motor 220 to the inner side of the annular plate of the motor anchor 226. A coplanar array of radial drilled and tapped holes consistent with the center drill drive mounting holes 109 in the carrier tube 101 extends through the arcuate surface of the ears to serve as carrier tube attachment screw holes 228. Screws 114 engage both the carrier tube mounting holes 109 and the screw holes 228 in the spinner motor anchor to rigidly attach the spinner motor to the carrier tube 101.

The collet assembly 230, shown in longitudinal cross-section in FIG. 20, serves to grip or release the center drill 240 in response to the axial load in the reciprocable drawbar 135. The single acting hydraulic collet closer 124 passively tensions the drawbar 135 to cause gripping by the collet 234 of the collet assembly 230, while the application of fluid pressure to the collet closer causes the drawbar to be compressed so that the drill 240 is released through loosening of the collet. The primary elements of the collet assembly 230 are the collet housing 231, the collet 234, and a shaft clamp 200. The collet housing 231 has a right circular cylindrical exterior with a mildly tapered frustroconical housing bore 232 on its inner end and a cylindrical counterbore on its outer end. The drill drive shaft 210 extends to the transverse shoulder at the bottom of the counterbore and, along with the collet assembly 230, is gripped there by a shaft clamp 200 which is engaged to grip in the counterbore at the inner end of the collet housing 231.

The collet 234 has a short tapped straight bore at its smaller end with a longer counterbore which is a close fit to the shank of drill 240 extending most of its length. The threads of the tapped hole are threadedly engaged with the threads 136 at the inner end of the drawbar 135. On its exterior, the collet 234 has a shallow frustroconical taper so that it enlarges in the inward direction. The exterior taper of collet 234 corresponds to that of the housing bore 232 of the collet housing 231. A male O-ring groove mounting O-ring 238 is located close to the smaller end of the collet. Multiple coolant passage holes 236 are drilled in a regular circular array parallel to the longitudinal axis of the collet 234 and offset therefrom.

Multiple regularly spaced radial collet slits 235 extending about 60 percent of the length from the larger end make the slit portion of the collet radially flexible so that it can be wedged into the housing bore 232 of collet housing 231 in order to grip the shank of the center drill 240. The wedging is induced by passively tensioning the drawbar 135 through the action of the Belleville springs 141 of the collet closer 124. Collet 234 release is effected by compressing the drawbar 135 by applying hydraulic pressure to the single-acting piston 130 of the collet closer 124, thereby pressing on the flange of the drawbar and moving it axially inwardly.

The center drill 240 has a short conventional fluted twist drill on a flanged shank with a threading tap positioned between the twist drill section and the transverse flange. The helical flutes of the twist drill and the helical tapping flutes 241 are configured to cut when rotated counterclockwise when viewed from the shank end of the drill 240. The drill 240 has an axial central coolant passage extending approximately half of the drill length, where it is intersected by a pair of radially opposed holes of the coolant outlet 243. The coolant outlet holes intersect longitudinal external coolant grooves 244 which extend the length of the tapping flutes 241. Coolant emerging from the inner end of the drill drive shaft 210 flows through the coolant passages 236 of the collet 234 to enter the axial central coolant passage of the center drill 240 and exit through the coolant outlet holes 243 and the external coolant grooves 244.

The Holesaw Assembly 250

The holesaw assembly 250, seen in its mounted position in FIG. 13, is positioned coaxially with both the carrier tube 101 of the machine cartridge 100 and with the center drill assembly 120. The axial position of the holesaw assembly 250 within the carrier tube 101 is around the drill drive shaft 210 between the center drill spinner motor 220 and the collet assembly 230. The holesaw 290 surrounds the collet 230 and the center drill 240 prior to initiation of cutting by the hot tap machine 10. FIGS. 29 and 35 respectively show the holesaw assembly in an exploded view and a longitudinal cross-sectional view.

The holesaw lead screw assembly 251 primarily consists of the holesaw lead screw drive motor 252, the nontranslating holesaw feed screw 253, the holesaw nonrotating nut 258, and the drive motor guide disk 262. The holesaw lead screw drive motor 252 is similar in construction in most details to the center drill feed motor 187 including its sensors, reduction gears, and the pressure balance membrane (not shown). However, holesaw lead screw drive motor 252 has its mounting flange of the motor body 246 machined off more and encircled by a motor adapter sleeve 192. Coplanar radial drilled and tapped holes 247 are located in the remnants of the mounting flange in a pattern corresponding to the pattern of holes 108 in the carrier tube. The motor 252 has the same power cords 189 and motor spindle 190 as the motor 187.

The motor sleeve adapter 192 is an annular right circular cylindrical sleeve which is wider than the original flange of the motor. The bore of the motor adapter sleeve 192 is a close fit to the reduced flange of the motor body 246, while the outer diameter of the sleeve is a slip fit to the cylindrical bore 106 of the carrier tube 101. The motor sleeve adapter 192 has cable passageways comparable to the cable passageways 193 on motor 187. Radial bolt clearance holes in the same pattern as the mounting holes 247 of the motor body 246 penetrate the annular wall of the sleeve adapter 192.

The nontranslating holesaw feed screw 253 is similar in its general construction to the drill nontranslating 180. The nontranslating holesaw feed screw 253 is a body of revolution which has a through bore which is a close sliding fit to the outer surface of the tubular drill drive shaft 210. The exterior of the nontranslating holesaw feed screw 253 has sequentially from its outer end a short concentric annular alignment nose, an outwardly extending flange, a thin wall central section, and a male threaded upset inner end with screw threads 254. The male threads 254 are threadedly engaged with the female nut screw threads 261 of the translating holesaw nonrotating nut 258. Multiple bolt holes in a regular circular pattern parallel to the axis of the screw penetrate the flange of the nontranslating holesaw feed screw 253. A female O-ring groove containing O-ring 256 is located interior of the upset inner end of the screw 253 and serves to seal between the screw and the drill drive shaft 210.

The nontranslating holesaw feed screw 253 is mounted to the face of the motor spindle 190 of the holesaw lead screw drive motor 252 by mounting screws 255 threadedly engaged in the screw mounting holes 191. The rigidly connected nontranslating holesaw feed screw 253 and the holesaw lead screw drive motor 252 are in turn rigidly mounted in the cylindrical bore 106 of the carrier tube 101 by screws 113 engaged through holes 108 of the carrier tube.

Holesaw nonrotating nut 258 is constructed similarly to the drill translating nut 170 of the center drill lead screw assembly 160, with the differences being that nut 258 is longer to provide more travel, clearance notches for hydraulic lines and cables are provided in its mounting flange, and no counterbore for bearing mounting is provided. The holesaw nonrotating nut 258 has a right circular tubular body with an outwardly extending transverse flange having multiple outwardly opening clearance notches which serve as cable and hydraulic passages 259. Six through bolt holes through the flange are parallel to and offset from the longitudinal axis of the nut 258 and are on the same bolt hole pattern as the tapped mounting holes on the outer transverse end of the holesaw drive motor 274. Internally, the holesaw nonrotating nut 258 has female nut threads 261 extending its full length. Mounting screws 260 attach the holesaw nonrotating nut 258 to both the drive motor guide disk 262 and to the holesaw drive motor 274 of the holesaw and holesaw drive motor assembly 273.

Drive motor guide disk 262, seen in an axial end view from the outward side in FIG. 30 and a three-quarter section in FIG. 31, serves as a nonrotating guide which interacts with the hexagonal guide section 103 of the carrier tube 101 to prevent relative rotation. Drive motor guide disk 262 permits axial translation of the reciprocable portions of the holesaw assembly 250 while preventing rotation of the body 275 of the holesaw drive motor 274.

The drive motor guide disk 262 is a thick plate having an axially inwardly extending boss and with a polygonal periphery 264 which has a hexagonal profile with rounded corners and which is a slip fit to the hexagonal guide section 103 of the carrier tube 101. Multiple rectangular coolant return notches 269 are cut into the periphery 264 parallel to the longitudinal axis of the disk 262. Two large off-center diametrically opposed holes serve as cable and hydraulic passages 265. A drilled and tapped saw coolant injection hole 266 extends approximately halfway through the disk 262, where it is intercepted by a inwardly opening radial coolant hole 267, as seen in FIG. 31. The radial coolant hole 267 can be drilled from the outside and then closed with a welded or pressed-in plug.

Multiple through mounting holes 268 are symmetrically placed about the longitudinal axis of the disk 262 in a pattern consistent with the mounting holes on the outward transverse end of the holesaw drive motor 274. Referring to FIG. 31, the coaxial boss extending from the inward side of disk 262 has a short right circular cylindrical exterior with a male O-ring groove for O-ring 272 intermediate to its length. The outer diameter of the boss is a slip fit into the bore of the spindle 276 of the holesaw drive motor 274 so that the O-ring 272 seals between the motor 274 and the disk 262. The coaxial bore 263 of the drive motor guide disk 262 is seen to be stepped, with the bore larger on its inward side and a female O-ring groove for housing O-ring 271 located intermediately to the smaller bore. The smaller of the stepped bores 263 is a close fit to the outer diameter of drill drive shaft 210, and O-ring 271 seals between the disk 262 and the drill drive shaft 210. Holesaw coolant feed line 270 with its threaded attached fitting is connected to the disk 262 by means of the threads of the saw coolant injection hole 266.

The holesaw and holesaw drive assembly 273 consists of the primary components the holesaw drive motor 274, the holesaw coolant distributor 279, and the holesaw 290. These components are coaxially mounted and are reciprocated within the carrier tube 101 of the cartridge 100. The interaction of the attached drive motor guide disk 262 with the hexagonal guide section 103 of the carrier tube 101 keeps the assembly 273 from rotating relatively to the carrier tube. The reciprocation of the holesaw nonrotating nut 258, attached to the assembly 273 with the drive motor guide disk 262 causes the whole assembly to translate axially.

The holesaw drive motor 274 is a modified commercially available reversible hydraulic motor with a motor body 275 and a hollow motor spindle 276. The holesaw drive motor 274 will use commercially available components, but will require modifications to its body 275 and fluid inlet/outlet ports to permit its use inside the carrier tube 101 in the hot tap machine 10. The holesaw drive motor 274 is fitted with sensor means so that its radial position and speed can be determined remotely by the operator of the hot tap machine 10. The holesaw drive motor body 275 has a drilled and tapped set of mounting holes on its outer transverse end.

The holesaw drive motor spindle 276 has an external transverse drive flange and a hollow shaft which has ample clearance with the drill drive shaft 210 so that the annulus can serve as a coolant flow passage. The drive flange of the motor spindle 276 is located on the inward side of the drive motor 274. The drive flange has a regularly spaced bolt circle of drilled and tapped mounting holes located in its inner face. The holesaw drive motor 274 is provided with two motor hydraulic supply lines 277, an electrical communications cable (not shown) and, if necessary, a motor hydraulic case drain line (not shown). Mounting screws 255 are used to rigidly interconnect the holesaw nonrotating nut 258 to the drive motor guide disk 262 and the holesaw drive motor 274.

The holesaw coolant distributor 279, seen in FIGS. 29, 35, 36, and 37, is a short heavy-wall right circular cylindrical annular disk having a large coaxial counterbore internal cavity 280 on its outer side facing the drive flange of the holesaw drive motor spindle 276. The holesaw coolant distributor 279 serves as a driveshaft for connecting between the flange of the motor spindle 276 of the holesaw drive motor 274 and the holesaw 290. The through bore of the coolant distributor has a female O-ring groove intermediate to its length and is a close fit to the drill drive shaft 210. Bore O-ring 285 is installed in the groove in the bore to seal between the coolant distributor 279 and the drill drive shaft 210. The outer transverse face of coolant distributor 279 is relatively narrow and has a face seal groove mounting motor side face seal O-ring 286 to seal to the drive flange of the holesaw drive motor spindle 276. The inner transverse face of the coolant distributor has two concentric face seal grooves mounting respectively the saw side inner face seal O-ring 287 and the saw side outer face seal O-ring 288. O-rings 287 and 288 seal between the coolant distributor 279 and the and the inner transverse face of the holesaw 290.

Multiple regularly spaced mounting holes in a bolt hole circle about the longitudinal axis of the coolant distributor 279 are consistent with the pattern of mounting holes in the drive flange of the holesaw drive motor spindle 276. The mounting holes are spaced outwardly of the motor side face seal O-ring 286. Multiple coolant delivery through holes 281 are drilled parallel to and offset from the longitudinal axis of the coolant distributor 279 in a regularly spaced pattern, as seen in FIG. 36. The coolant delivery holes 281 exit the inner end of the coolant distributor between the saw side face seal O-rings 287 and 288.

As seen in FIG. 37, multiple larger diameter holes 282 and 283 are drilled on the inner, saw side of the coolant distributor 279 in order to provide a coolant return path. Multiple first coolant return holes 282 are drilled in a regularly spaced pattern to a depth of approximately half the interior axial wall thickness from the inner end of the coolant distributor 279. The first coolant return holes 282 are spaced between adjacent coolant delivery holes 281 and are parallel to and offset from the axis of the coolant distributor 279. A radial second coolant return hole 283 is drilled from the outside to intersect each first coolant return hole 282. The transverse face of the holesaw 290 does not cover the first coolant return holes 282, so the return flow of the holesaw coolant passes through the interior of the holesaw and then to the exterior of the coolant distributor 279.

The holesaw 290 has a relatively thin-wall circular tubular body with a thick transverse annular mounting flange at its outer end. The holesaw 290 has multiple teeth 291 configured to cut in a clockwise direction when viewed from its outward end. The teeth 291 are displaced alternately radially inwardly and outwardly in order to cut a wider kerf than the saw teeth support tube section 292 at the inner end of the holesaw. The maximum outer diameter of the outer tips of the holesaw teeth 291 is slightly less than the diameter of the hydrostatic bearing section 293, located between the saw teeth support tube section and the transverse flange. The outer diameter of the coaxial hydrostatic bearing section 293 is a very close fit to neck bore 305 of the clamp top 303 of the hot tap fitting 301 and a somewhat looser fit to the bores in the rest of the hot tap fitting assembly 350 and the housing assembly 11. The length of the saw teeth support tube section 292 is longer than the anticipated depth of cut into the pipe for the holesaw. The length of the hydrostatic bearing section 293 is approximately half the diameter of the holesaw.

At both ends of the cylindrical hydrostatic bearing section 293, annular external coolant distribution grooves 294 interconnected by multiple regularly spaced external longitudinal coolant distribution grooves 295 aid in the distribution of coolant around the entire hydrostatic bearing section 293. The outer face of the holesaw flange has a circumferential collector face groove 289 which has the same mean diameter as the hole circle of the coolant delivery holes 281 of the coolant distributor 279. The collector face groove 289 lies between the face O-ring grooves mounting O-rings 287 and 288 of the coolant distributor 279, so the groove 289 is isolated. Multiple regularly spaced coolant entry holes 299 parallel to the axis of the hole saw and starting in the bottom of the collector groove 289 penetrate approximately halfway through the mounting flange of the holesaw, where they each are intercepted by an outwardly opening radial coolant feed hole 296. This may be seen in sectional view FIG. 36 showing the holesaw and holesaw drive assembly 273 with the attached drive motor guide disk 262. The radial coolant feed holes 296 each intercept the outer of the annular coolant distribution grooves 294 to establish a flow circuit to feed the hydrostatic bearing section 293.

Multiple countersunk mounting bolt holes 297 are located in the mounting flange of the holesaw 290 on the same pattern as the drilled and tapped mounting holes on the drive flange of the motor spindle 276 of the holesaw drive motor. Flathead mounting screws 298 are engaged through the mounting bolt holes 297, the mounting holes of the coolant distributor 279, and threadedly engaged in the mounting holes on the drive flange of the motor spindle 276 to rigidize the rotating assembly. The holesaw nonrotating nut 258, the drive motor guide disk 262, and the body 275 of the holesaw drive motor 274 all are able to translate as a unit, but they cannot rotate. The motor spindle 276 of the holesaw drive motor 274, the coolant distributor 279, and the holesaw 290 all translate with the body of the holesaw drive motor and its attached nonrotating components. Rotation of the nontranslating holesaw feed screw 253 by the motor 252 causes the translation of the reciprocable components of the holesaw assembly 250.

Hot Tap Fitting Assembly 300

The hot tap fitting assembly 300 for the present invention consists of a hot tap fitting 301, a gate valve 320, a connector hub 340, and an upper connector socket 350. The hot tap fitting 301 is a special type of split pipeline repair clamp that has a tee branch located on one side of the clamp. The hot tap fitting 301 is arranged so that a pipe 380, which is gripped and sealed around by the fitting 301, can be accessed through the tee branch so that a hole can be cut in the wall of the pipe by holesawing and the resultant pipe coupon removed. This work can be performed with the pipe 380 under pressure. Hot tap fittings are available from numerous sources and a variety of pipe sealing and gripping schemes for hot tap fittings are utilized commercially. Accordingly, the internals of the hot tap fitting 301 are not shown or discussed herein, since these details are well known in the state of the art.

Referring to FIGS. 2 and 12, a hot tap fitting 301 is seen in both oblique and transverse cross-sectional views. The hot tap fitting 301 has a clamp bottom 302 and a clamp top 303. Each end of both the clamp top 303 and clamp bottom 302 are provided with multiple actuator cylinders 304 to actuate internal pipe gripping means (not shown) for rigidly holding the pipe axially. The clamp halves 302 and 303 are hinged on one side by two hinge assemblies 310, with each hinge assembly consisting of a hinge plate for each clamp half and a pivot bolt. An open/close arm 311 is mounted on the hinge side of each clamp half 302 and 303 in the middle of the fitting 301, with the arms being coplanar. An open/close hydraulic cylinder 309 has the cylinder end pivotably attached to one arm 311 and its rod end pivotably attached to the other arm 311 so that the fitting can be opened and closed readily.

Extending outwardly from the middle of the clamp top 303 is a tubular tee branch having a neck bore 305 and an upper flange 312. Near the upper end of the neck bore 305 is located a latching groove 306 for accessories (not used for the hot tap machine 10), such as a completion plug. The upper transverse end of the upper flange is provided with face grooves for engagement with a sealing ring 323. Studs 307 and nuts 308 are used to engage outwardly projecting ears on the clamp halves 302 and 303 so that the hot tap fitting halves can be securely held together.

A gate valve 320 is mounted to the upper flange 312 of the hot tap fitting 301 by means of studs 327 and nuts 328 engaged through holes in the bolt circle of the flange and into drilled and tapped holes in the body 321 of the gate valve 320. The gate valve 320 also is attached to a flanged connector hub 340 on its upper side in a similar manner. Sealing rings 323 are used to seal between the gate valve 320 and face seal grooves in its connections on either side. The axis of the gate valve 320 is vertical and aligned with the neck bore 305 of the hot tap fitting 301. The holes through the gate valve body 321 and the gate 322 are full bore, so that they are the same size or larger than the neck bore 305 of the hot tap fitting 301. The gate 322 of gate valve 320, operated by gate valve operator 324, is selectably reciprocable horizontally to effect valve opening or closing to provide pressure isolation of the pipe 380 and hot tap fitting 301.

The connector hub 340 has a neck bore 341 of the same size or slightly larger than the neck bore 305 of the hot tap fitting 301. The connector hub is coaxial with both the neck bore 305 and the axis of the gate valve 320. The connector hub 340 is joined concentrically on its upper end by a circumferential weld 343 to the upper connector socket 350. The upper connector socket 350 has been described previously herein.

Second Embodiment of the Center Drill

A second embodiment 390 of the center drill is shown in FIG. 39. The second embodiment center drill 390 has a drill body 391 which is similar to the twist drill first embodiment 240 in having an axial coolant passage with a coolant outlet 394, a shank, a flange, and tapping flutes 392 with longitudinal external coolant grooves 393. The difference for second embodiment center drill 390 is the provision of a carbide insert 395 held in place in a close fitting machined pocket by a screw 396 for providing a cutting edge for the drill, rather than using conventional twist drill cutting. The center drill 390 is configured to cut when rotated counterclockwise when viewed from the shank end. Carbide insert drills are in common use in industry and are well known in the state of the art. The advantage of using a carbide insert drill is that it can drill much faster and at a higher rotational speed than a typical twist drill. Otherwise, the operation of drill 390 and its utilization in the hot tap machine 10 of the present invention is identical to that of the twist drill 240 previously described.

OPERATION OF THE INVENTION

Coolant Flow

Selectably pumped liquid coolant for the center drill 240 enters the center drill assembly 121 through coolant feed line 152 attached on a first end to the housing cap assembly 24 and to the drill coolant inducer 150 on a second end. The flow from the drill coolant inducer 150 enters the drill drive shaft 210 through radial coolant entry ports 211, passes inwardly to the collet assembly 230, and exits through collet coolant passages 236 into the center drill 240. The coolant flow in the center drill 240 is through its central coolant passage 242, out its radial coolant outlets 243, and to some degree along the external coolant grooves 244. The center drill coolant flow path is not a closed loop, although return flow could be taken through a return path provided for the holesaw if the pipe were liquid filled.

Selectably pumped liquid coolant enters the holesaw assembly 250 by passing from the coolant feed line 270 attached to the housing cap assembly 24 on a first end and to the drive motor guide disk on a second end through the radial coolant hole 267 and into the annulus between the drill drive shaft 210 and the bore of the holesaw motor spindle 276. The coolant then enters the internal cavity 280 and the holesaw coolant delivery holes 281 of the coolant distributor 279 before entering sequentially the coolant collector groove 289, the coolant entry holes 299, and the radial coolant feed holes 296 of the holesaw 290.

Holesaw coolant exits the feed holes 296 into the annulus between the hydrostatic bearing section 293 and the neck bore 305 of the hot tap fitting 301. The holesaw coolant is delivered at sufficiently high pressure that a hydrostatic bearing is induced between the hydrostatic bearing section 293 at the outer end of the holesaw 290 and the hot tap fitting neck bore 305, thereby providing excellent lateral support to the holesaw and also providing high vibrational damping.

Because both the coolant distributor 279 and the body 275 of the holesaw drive motor 274 are externally smaller than the hexagonal guide section 103 of the carrier tube 101, the coolant return flow emerging from the coolant return holes 283 of the coolant distributor 279 is able to pass by the motor 274 and through the coolant return notches 269 in the drive motor guide disk. The passage of the return flow of the holesaw coolant by the holesaw motor is through the annular gap 117, shown in FIG. 37, between the hexagonal guide section 103 of the carrier tube 101 (indicated by a dashed line) and the exterior of the body 275 of the holesaw motor 274. The return flow can then be recovered by the pump suction line for recycling by the coolant pump.

Coolant escapes from the hydrostatic bearing zone by flowing towards the teeth 291 of the holesaw. If the saw has not penetrated the pipe 380, a closed loop flow circuit can be established for the coolant. In the event that the pipe 380 is penetrated and is gas-filled, return circulation is lost. However, if the penetrated pipe 380 is liquid filled and not flowing, a certain portion of the coolant can be recovered by the pump suction line which has its pickup on the outer side of the drive motor guide disk 262 of the holesaw assembly 250.

Relative Motions of the Subsystems of the Internal Assemblies 120

The hot tap machine 10 of the present invention utilizes two separate drive motors for rotating two independently operated coaxial drive shafts. The interior drill drive shaft 210 powers a center drill, either a twist drill center drill 240 or a carbide insert center drill 390. The outer drive shaft powers the holesaw 290. Likewise, an independently operated feed screw system is utilized for each of the two shafts. The center drill lead screw assembly 160 is driven by the drill feed motor 187, while the holesaw lead screw assembly is driven by holesaw lead screw drive motor 252.

The collet closer assembly 124, the coolant inducer 150, and the drill translating nut 170 of the center drill lead screw assembly 160 are all fixedly interconnected, but can translate axially relative to the carrier tube 101. The sliding interaction of the guide slots 164 of the antirotation sleeve 162 against the guide arms 123 of the fixedly mounted antirotation guide 122 permit translation but not relative rotation. The antirotation guide 122, the drill feed motor 187, the drill nontranslating screw 180, and the drill spinner motor 220 with its spinner motor anchor 226 do not move axially relative to the carrier tube 101 due to their attachment thereto by the mounting screws 114, 115, and 116. The drill drive shaft 210, the collet assembly 230, the center drill 240, the shaft torque transfer clamp 208, and portions of the drill shaft support bearing assembly 212 all are rigidly interconnected so that they rotate and translate together as a unit.

The axial translation of the drill drive shaft 210 and its attached components is caused by rotation of the drill nontranslating screw 180 fixed to the motor spindle 190 of the nontranslating drill feed motor 187. The rotation of the drill drive shaft 210 and its attached components is caused by rotation of the hollow spinner motor shaft 222 of the drill spinner motor 220 acting upon shaft torque transfer clamp 208.

Operation of the Latch Assembly 70

When the latch actuator 86 is reciprocated downwardly so that its nose 90 abuts the stop shoulder 74 of the latch core 71, the land 91 and the central cylinder 92 of the latch actuator 86 are displaced axially downwardly. This downward displacement causes the frustroconical ramps of both the latch actuator and the latch dogs 82 interact to outwardly cam the latch dogs 82 so that they are extended radially outwardly through the windows 78 of the latch dog cage 77, as shown in FIG. 7. This downward movement of the latch actuator 86 is prevented when the latch dogs 82 are restrained by the inner cylindrical wall of the housing liner 17. Such outward movement of the latch dogs 82 is enabled when the dogs are adjacent the latch groove 14 of the housing tube 12. The length of the latch dogs 82 is selected to be a close fit to the latch groove when the dogs are outwardly expanded. As a consequence, extending the piston rod 59 of the extender cylinder 57 can cause the latch assembly 70 to firmly interconnect with the housing 12.

Retracting the piston rod 59 will cause the latch assembly 70 to disconnect from the housing 12 by withdrawing the support of the land 91 and central cylinder 92 of the latch actuator 86 from under the lands 83 of the latch dogs 82. The upward force of the cylinder 57 acting through the upper frustroconical exterior shoulder of the latch dogs 83 against the upper frustroconical shoulder of the groove 14 produces a radially inward force which causes the unsupported latch dogs to retract, as shown in FIG. 6.

Although it is not shown herein, some means of providing additional frictional resistance to latch reciprocation within the housing liner 17 may be necessary in order to ensure reliable setting of the latch mechanism. This additional friction can be applied by means of rubber friction pads having diametrical interference with the bore of the liner 17. Alternatively, barrel stave springs having diametrical interference with the bore of liner 17 may also be used.

Operation of the Machine for Hot Tapping

For the hot tap machine 10, the extender cylinder 57 of the hot tap machine housing assembly 11 is used to insert the machine cartridge 100 into the bore of the hot tap fitting assembly 300 so that the tip of the holesaw 290 and of the center drill 240 are in close proximity to the surface of the pipe 380. When the latch dogs 82 of the latch assembly 70 encounter the latch groove 14, the latch is engaged with the body of the housing tube 11 and biased to the inward side of the groove 14 by the pressure maintained on the cylinder 57 to keep it extended. This bias force maintains a rigid mounting condition for the cartridge 100 inside the housing 11. The position of the inserted machine cartridge 100 then is such that the drill 240 and the holesaw 290 are adjacent the wall of the pipe 380, as shown in FIG. 41.

The drill shaft spinner motor 220 is then turned on and the drill feed motor 187 is used to advance the rotating drill 240 attached to the drill drive shaft 210 into the pipe 380. When the drill 240 fully emerges into the pipe 380, the rotation of the drill is slowed and tapping initiates. The rotational speed and feed of the drill shaft 210 mounting the combination drill/tap 240 are coordinated to operate at a predetermined fixed ratio in order to obtain a good cut thread. This is done by using feedback from the sensors of the spinner motor 220 and the drill feed motor 187 so that the shaft 210 is uniformly advanced one thread pitch for every shaft rotation. If drill coolant is utilized with the coolant-fed drill 240 of FIG. 38, it is applied at this time. The tapping continues until the thread on the pipe is firmly engaged by the threads of the tap. If possible, the tapping should continue until the flange of the drill 240 encounters the outer wall of the pipe 380. This rigidizes the connection between the pipe 380 and the hot tap machine 10. Drill shaft rotation and feed are then complete and the relation of the hot tap machine 10 and the pipe 380 are as shown in FIG. 42.

Figure 43:
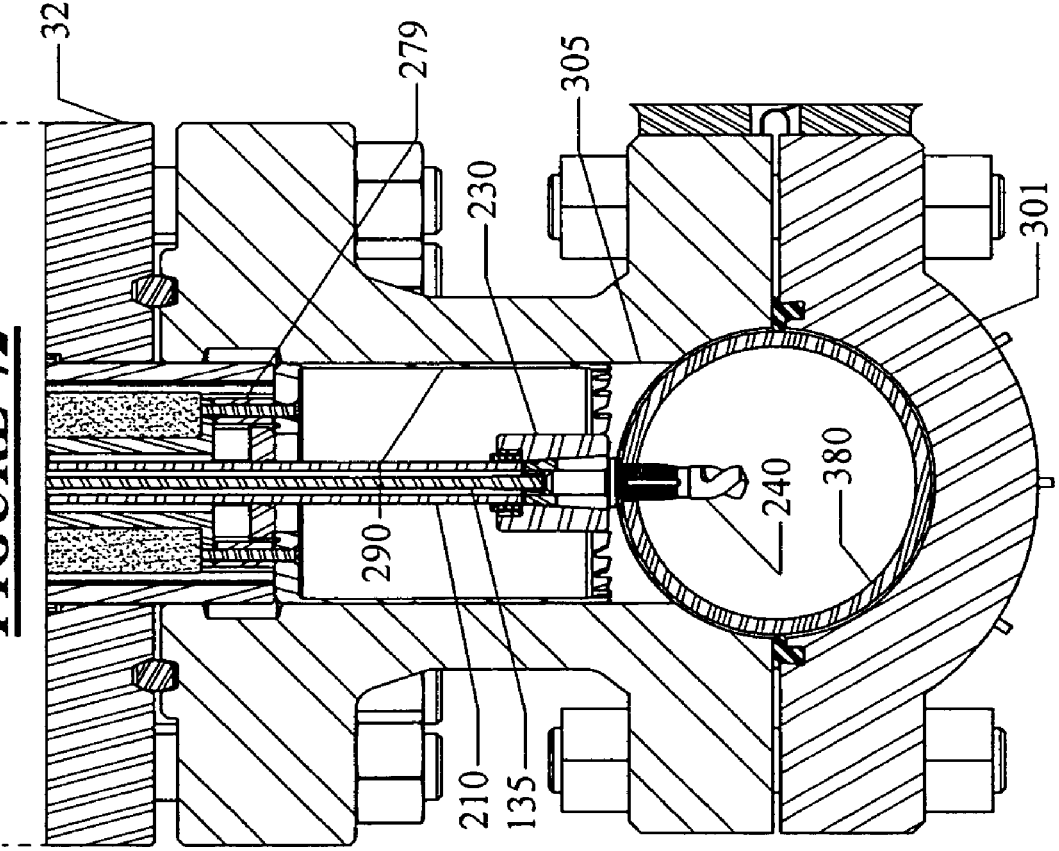
FIG. 43 is a partial cross-sectional view corresponding to FIG. 42, but after the pipe is fully cut by the holesaw.

Following the completion of the drilling and tapping operation, the holesaw coolant flow is turned on and the holesaw drive motor 274 is engaged to rotate for cutting in a direction opposite to the direction of the center drilling and tapping rotation. This opposite rotation is critical in order to avoid unscrewing the cut coupon 399 of the pipe 380 after the holesaw 290 completes its cut. The holesaw 290 is advanced into the pipe 380 by the variable speed holesaw feed motor. The holesaw feed and speed can be selectably varied so that the cutting operation is optimized. During the cutting, the holesaw 290 is stabilized and lubricated by the hydrostatic bearing between the exterior of the holesaw at its hydrostatic bearing section 293 and the neck bore 305 of the hot tap fitting 301. When the cut is completed as shown in FIG. 43, the feed of the holesaw is reversed so that the holesaw 290 is withdrawn. With the holesaw 290 retracted, the holesaw coolant can be stopped. Likewise, the axial feed of the drill shaft 210 is reversed without shaft rotation so that the coupon 399 is also withdrawn. Typically, both of these operations can be done simultaneously. The cartridge 100 of the hot tap machine 10 along with the retained pipe coupon can then be retracted into the hot tap machine housing assembly 11 and the gate valve 320 closed to isolate the pipe. Then hot tap machine 10 with its housing 11 can be removed from the hot tap fitting assembly 300 by disconnecting the hot nut female half 40 of the housing assembly 11.

In the event of machine trouble after hot tap cutting has begun, the machine cartridge 100 of the hot tap machine 10 can be removed from the pipe 380 and the hot tap fitting assembly 300. Removal is done by first reversing the feed of the holesaw lead screw drive motor 252 so that the holesaw 290 is withdrawn axially from the pipe 380. If necessary, the holesaw 290 can be rotated during this process to ease retrieval. Then the drill spinner motor 220 for the drill drive shaft 210 can be reversed while the synchronized drill shaft feed provided by the drill feed motor 187 is reversed so that the tap of the combination drill/tap center drill 240 is disengaged. The center drill 240 can then be fully retracted by using the center drill lead screw assembly 160 and the drill feed motor 187 so that the machine cartridge 100 can be withdrawn from the hot tap fitting assembly 300 by the extender cylinder 57. The gate valve 320 then can be closed to isolate the pipe 380 and the hot tap fitting assembly 300. Following this, the hot nut female half 40 of the housing assembly 11 can be disconnected so that the hot tap machine 10 can be fully removed.

In the event that the center drill 240 cannot be extracted in the manner described immediately above or if disengagement in this manner is not desired, then alternatively the collet closer 124 can be used to release the collet assembly of the hot tap machine 10 from the center drill. This release is performed by pressurizing the single-acting piston 130 of the collet closer 124 by hydraulic fluid supplied through collet opening hydraulic line 148 and port 127 to urge the piston inwardly, thereby overcoming the bias force of the Belleville springs 141 and placing compression on the drawbar 135. The collet 234 releases the shank of the drill 240 with application of drawbar compression. In such a case, the center drill 240 is left in the pipe 380, but the remainder of the cartridge 100 of the machine 10 can be withdrawn from the hot tap fitting assembly 300. Withdrawal in such a case would involve fully retracting the holesaw 290 and the drill drive shaft 210 with its attachments (excluding the drill 240), followed by cartridge 100 withdrawal by the extender cylinder 57. The hot tap machine 10 can later be reattached by reversing this detachment procedure.

It is also possible to withdraw the hot tap machine cartridge 100 back into its housing 11 by forcefully pulling the cartridge 100 and its machine internal assemblies 120 out of the hot tap fitting assembly 300 with the extender cylinder 57. In such a case, the high force exerted by the cylinder 57 would overcome the tensile capacity of the collet drawbar 135 or would forcibly pull the shaft of the center drill 240 from the collet 234.

ADVANTAGES OF THE INVENTION

The present invention permits remote operation after its installation on the hot tap fitting, thereby much improving operator safety. Additionally, the monitoring and selectable control of the hot tap machine permit optimization of the cutting operations. The improved coupon retention capability of the present invention eliminates one of the most troublesome failure modes of the current machines. The ability to disengage from the pipe in more than one way in the event of machine problems is much improved over conventional hot tap machines, as the collet release and the retraction means of the hot tap machine housing can be used to disengage the machine in event of inability to rotate the rotational drive motors.

One of the most important advantages of the present invention is the provision of the hydrostatic bearing between the holesaw and the branch bore of the hot tap fitting. This hydrostatic bearing will support flow induced side loads on the holesaw while maintaining high positional accuracy, thereby permitting much more accurate cuts to be made by the machine. The elimination of excessive lateral play of the holesaw due to use of the hydrostatic bearing is a primary source of cutting accuracy. Additionally, the hydrostatic bearing results in less frictional drag and wear on the holesaw, resulting in more power availability for faster cutting. The accuracy of cutting and the increase of cutting speed because of improved rigidity offer definite improvements over current practice. The provision of accurate cuts greatly simplifies the subsequent use of line stoppers in the hot-tapped pipe. Additionally, provision of an accurate cut equalizes the residual axial strength of the pipe to either side of the hot tap penetration. The avoidance of a rotary shaft seal on the pressure containing housing assembly improves the high pressure capability of the present invention over conventional designs. This and other advantages of the present invention will be obvious to those skilled in the art.

As well may be understood by those skilled in the art, certain features of the hot tap machine of this invention may be modified without departing from the spirit of the invention. For instance, electric motors could be used for one or both of the center drill and holesaw drives instead of the hydraulic motors shown. Likewise, one or both of the electric motors used for the lead screw drives could be hydraulic, rather than electric. Other types of linear actuators such as ball screws, rack and pinion sets, and the like could be used in place of the extender cylinder to reciprocably move the cartridge of the hot tap machine. A commercially available collet closer could be used in place of the collet closer described herein. There are also other types of remotely operable connectors besides the hot nut connector for coupling the housing assembly with the hot tap fitting. Other arrangements of the control and coolant connections between the housing cap assembly and the cartridge could be utilized. More extensive use of sensors and the data therefrom are certainly possible. However, these changes would not depart from the spirit of the invention.

What is claimed is:

1. A hot tapping machine having a first and a second independently operated pipe cutting system, wherein the first and second cutting systems are coaxially mounted in a machine cartridge, the machine cartridge being reciprocable between a first inoperative position wholly contained within a pressure-containing housing and a second operating position partially extending from the pressure-containing housing.

2. The hot tapping machine of claim 1, wherein the first pipe cutting system includes a drill shaft, a drill, a drill shaft rotation motor, and a feed mechanism for axially advancing and retracting the drill and the second pipe cutting system includes a holesaw, a holesaw rotating drive motor, and a feed mechanism for axially advancing and retracting the holesaw.

3. A hot tapping machine for the cutting of holes into a pipe under pressure when attached to a hot tap fitting surrounding the pipe, the hot tap machine including:
   (a) a pressure-containing housing;
   (b) a machine cartridge mounted within the housing, wherein the machine cartridge includes
      (i) a drill assembly having a drill, a drill shaft spinner motor, and a feeding mechanism for advancing and retracting the drill axially,
      (ii) a holesaw assembly coaxial with the drill assembly and having a holesaw, a holesaw drive motor and a feeding mechanism for advancing and retracting the holesaw axially; and
   (c) a reversible reciprocable system for extending the machine cartridge from the housing into an operating position and retracting the machine cartridge within the housing into an inoperative position.

4. The hot tapping machine of claim 3, wherein the drill has an integral tapping device for threading a hole cut into the pipe by the drill.

5. The hot tapping machine of claim 3, wherein the drill assembly and the holesaw assembly operate independently.

6. The hot tapping machine of claim 3 having the drill shaft spinner motor operated independently from the drill feeding mechanism and the holesaw drive motor operated independently from the holesaw feeding mechanism.

7. The hot tapping machine of claim 3, the drill assembly further comprising a drill shaft and a reciprocable collet mounted to the drill shaft, wherein the collet selectably reciprocates between a first position and a second position.

8. The hot tapping machine of claim 7, wherein the collet grips the drill when the collet is in the first position and the collet releases the drill when the collet is in the second position.

9. The hot tapping machine of claim 7, wherein the collet is attached to a selectably reciprocable collet closer supporting a drawbar that controls the reciprocation of the collet between the first and the second position.

10. The hot tapping machine of claim 3, wherein a coolant is fed to the drill.

11. The hot tapping machine of claim 3, wherein a coolant is fed to the holesaw.

12. The hot tapping machine of claim 11, wherein the coolant produces a hydrostatic bearing between an exterior surface of the holesaw and a bore of a hot tap fitting.

13. The hot tapping machine of claim 3, wherein the machine cartridge is latched into the operating position whenever the machine cartridge is extended to the operating position.

14. The hot tapping machine of claim 4, wherein the drill shaft spinner motor rotates the drill in a first direction while the drill is threading the hole and the holesaw drive motor rotates the holesaw in a second direction while cutting the pipe, the second direction being opposite the direction in which the drill is rotated.

15. The hot tapping machine of claim 3 being connectable to a hot tap fitting by a remotely operable connector.

16. The hot tapping machine of claim 3, wherein the drill has both a drilling cutter at one end and an adjacent coaxial tapping section.

17. A hot tapping machine for the cutting of holes into a pipe under pressure when attached to a hot tap fitting surrounding the pipe, the hot tap machine including:
   (a) a pressure-containing housing;
   (b) a machine cartridge mounted within the housing, wherein the machine cartridge includes
      (i) a drill assembly having a drill shaft, a drill with an integral tapping device, a drill shaft rotating motor, and a feeding device for axially advancing and retracting the drill,
      (ii) a holesaw assembly coaxial with the drill assembly and operated independently of the drill assembly, wherein the holesaw assembly has a holesaw, a holesaw rotating motor and a feeding mechanism for axially advancing and retracting the holesaw;
   (c) a coolant distribution system that provides a coolant to an outer surface of the holesaw;
   (d) a reversible reciprocable system for extending the machine cartridge from the housing into an operative position and retracting the machine cartridge within the housing into an inoperative position; and
   (e) a latching mechanism that, affixes the machine cartridge to an interior of the pressure-containing housing when the machine cartridge is extended into the operative position.

18. The hot tapping machine of claim 17 having the drill shaft rotating motor operated independently from the drill feeding device and the holesaw rotating motor operated independently from the holesaw feeding mechanism.

19. The hot tapping machine of claim 17, wherein the drill shaft rotating motor rotates the drill in a first direction when the tapping device of the drill is threading a hole in a pipe and the holesaw rotating motor rotates the holesaw in a second direction opposite the direction the drill is rotated when the holesaw is cutting the pipe.

20. The hot tapping machine of claim 17, wherein the coolant provides a hydrostatic bearing between the outer surface of the holesaw and a bore of a hot tap fitting during rotation of the holesaw.

21. The hot tapping machine of claim 17, wherein the coolant distribution system provides coolant to the drill when the drill is rotated.

22. The hot tapping machine of claim 17, wherein the latching mechanism includes a latching actuator and a reciprocable latch dog.

23. The hot tapping machine of claim 22, wherein the affixing of the machine cartridge is effected when the latch dog moves to a first position as the machine cartridge is extended into the operative position and the machine cartridge is released when the latch dog is moved to a second position as the machine cartridge is retracted into the inoperative position.

24. The hot tapping machine of claim 17 being connectable to a hot tap fitting by a remotely operable controller.

25. The hot tapping machine of claim 17, the drill assembly further comprising a reciprocable collet mounted to the drill shaft, wherein the collet selectably reciprocates between a first position and a second position.

26. The hot tapping machine of claim 25, wherein the collet grips the drill when the collet is in the first position and the collet is released from the drill when the collet is in the second position.

27. The hot tapping machine of claim 25, wherein the collet is attached to a drawbar of a selectably reciprocable collet closer that controls the reciprocation of the collet between the first and the second position.

28. A hot tapping machine for the cutting of holes into a pipe under pressure when attached to a hot tap fitting surrounding the pipe, the hot tap machine including:
   (a) a pressure-containing housing;
   (b) a machine cartridge mounted within the housing, wherein the machine cartridge includes
      (i) a drill assembly having a drill, a drill shaft, a drill rotating means for rotating the drill, and a drill feeding means for advancing and retracting the drill axially,
      (ii) a holesaw assembly coaxial with the drill assembly and operated independently of the drill assembly, wherein the holesaw assembly has a holesaw, a holesaw rotating means for rotating the holesaw and a holesaw feeding means for advancing and retracting the holesaw axially;
   (c) an engagement means for reciprocably extending the machine cartridge from the housing into an operating position and retracting the machine cartridge within the housing into an inoperative position;
   (d) a latching means for affixing the machine cartridge to an interior of the pressure-containing housing when the machine cartridge is extended into the operative position; and
   (e) a coolant distribution means for providing coolant to an outer surface of the holesaw.

29. A method of cutting a hole into a pipe under pressure utilizing a hot tapping machine attached to a hot tap fitting surrounding the pipe, the method including the following steps:
   (a) drilling a hole in the pipe using a rotating drill;
   (b) tapping a helical thread in the hole with a tapping device positioned on a portion of the drill;
   (c) engaging the helical thread with a portion of the drill;
   (d) cutting a pipe coupon containing the threaded hole from the pipe using a holesaw;
   (e) feeding a coolant to an outside surface of the holesaw wherein the coolant forms a hydrostatic bearing between the outside surface of the holesaw and a bore of the hot tap fitting;
   (f) withdrawing the holesaw from the pipe; and
   (g) removing the drill and the pipe coupon from the pipe.

30. A method of cutting a hole into a pipe under pressure utilizing a hot tapping machine attached to a hot tap fitting surrounding the pipe, the method including the following steps:

(a) attaching the housing of a hot tapping machine including (i) a pressure-containing housing; (ii) a machine cartridge mounted within the housing, wherein the machine cartridge includes a drill assembly having a drill shaft, a drill with an integral tapping device, a drill shaft rotating motor, and a feeding device for axially advancing and retracting the drill, a holesaw assembly coaxial with the drill assembly and operated independently of the drill assembly, wherein the holesaw assembly has a holesaw, a holesaw rotating motor and a feeding mechanism for axially advancing and retracting the holesaw; (iii) a coolant distribution system that provides a coolant to an outer surface of the holesaw; (iv) a reversible reciprocable system for extending the machine cartridge from the housing into an operative position and retracting the machine cartridge within the housing into an inoperative position; and (v) a latching mechanism that affixes the machine cartridge to an interior of the pressure-containing housing when the machine cartridge is extended into the operative position onto a hot tap fitting;

(b) extending the machine cartridge into the operative position;

(c) activating the latching mechanism to secure the machine cartridge in the operative position;

(d) activating the drill shaft rotating motor and the drill feeding device;

(e) drilling a hole in the pipe using the drill;

(f) tapping a helical thread in the hole in the pipe;

(g) adjusting the rotational speed and the axial feed of the drill to be directly proportional while tapping the helical thread in the hole with a tapping device positioned on a portion of the drill;

(h) fixedly engaging the helical thread with a portion of the tapping device;

(i) inactivating the drill shaft rotating motor and the drill feeding device;

(j) activating the coolant distribution system to provide the coolant to the outer surface of the holesaw, thereby establishing a hydrostatic bearing between the holesaw and a bore of the hot tap fitting;

(k) activating the holesaw rotating motor and the holesaw feeding mechanism;

(l) cutting a pipe coupon containing the threaded hole from the pipe using the holesaw;

(m) withdrawing the holesaw from the pipe;

(n) stopping the flow of the coolant; and (o) removing the drill and the pipe coupon from the pipe while the coupon is threadedly engaged by the drill.

* * * * *